United States Patent
Mizutani

(10) Patent No.: US 8,457,493 B2
(45) Date of Patent: Jun. 4, 2013

(54) OPTICAL COMMUNICATION SYSTEM AND COMMUNICATION BANDWIDTH CONTROL METHOD

(75) Inventor: Masahiko Mizutani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 12/903,931

(22) Filed: Oct. 13, 2010

(65) Prior Publication Data

US 2011/0085799 A1    Apr. 14, 2011

(30) Foreign Application Priority Data

Oct. 14, 2009  (JP) ................................ 2009-236792

(51) Int. Cl.
    *H04J 14/00*    (2006.01)
(52) U.S. Cl.
    USPC ............................................. 398/58; 398/72
(58) Field of Classification Search
    USPC ............... 398/58, 70–72; 370/229, 235, 236, 370/442
    See application file for complete search history.

(56) References Cited

U.S. PATENT DOCUMENTS

| 7,433,312 | B2 * | 10/2008 | Yoshihara et al. | ............ | 370/235 |
| 7,653,080 | B2 * | 1/2010 | Takemoto et al. | ............ | 370/442 |
| 7,796,519 | B2 * | 9/2010 | Yoshihara et al. | ............ | 370/236 |
| 2003/0043741 | A1 * | 3/2003 | Mukai et al. | ................ | 370/229 |

OTHER PUBLICATIONS

International Telecommunication Union; Gigabit-capable Passive Optical Networks (G-PON): Transmission Convergence Layer Specification; ITU-T G.984.3 dated Mar. 2008; pp. i-v and 1-135.
International Telecommunication Union; G.984.4 Implementer's Guide, Second Revision; 2008, pp. 1-100.

\* cited by examiner

*Primary Examiner* — Dalzid Singh
(74) *Attorney, Agent, or Firm* — Foley & Lardner LLP

(57) ABSTRACT

In the communication system, a master station is coupled to slave stations by a fiber network comprising a splitter and a reach extender, the master station includes a first bandwidth control section which determines, based on a request from each slave station, a first data amount of a signal transmitted in a first cycle, the reach extender includes: a distance measurement section which measures a distance or a time between the reach extender and each slave station; and a second bandwidth control section which determines a second data amount and transmission timing of a signal based on a request from each slave station and the first data amount, and each slave station transmits a signal with a data amount, which the first bandwidth control section determined based on a data amount and transmission timing determined in second cycles, to the master station in the first cycle.

9 Claims, 12 Drawing Sheets

| Alloc-ID# 5001 | SStart 5002 | Sstop 5004 |
|---|---|---|
| 1 | DUMMY | 500 |
| 2 | DUMMY | 400 |
| 4 | DUMMY | 150 |
| i | DUMMY | xxx_ |

| Alloc-ID# 5001 | SStart 5002 | Sstop 5004 |
|---|---|---|
| 1 | 100 | 100 |
| 2 | 250 | 150 |
| 4 | 0 | 30 |
| i | i_Start | i_stop |

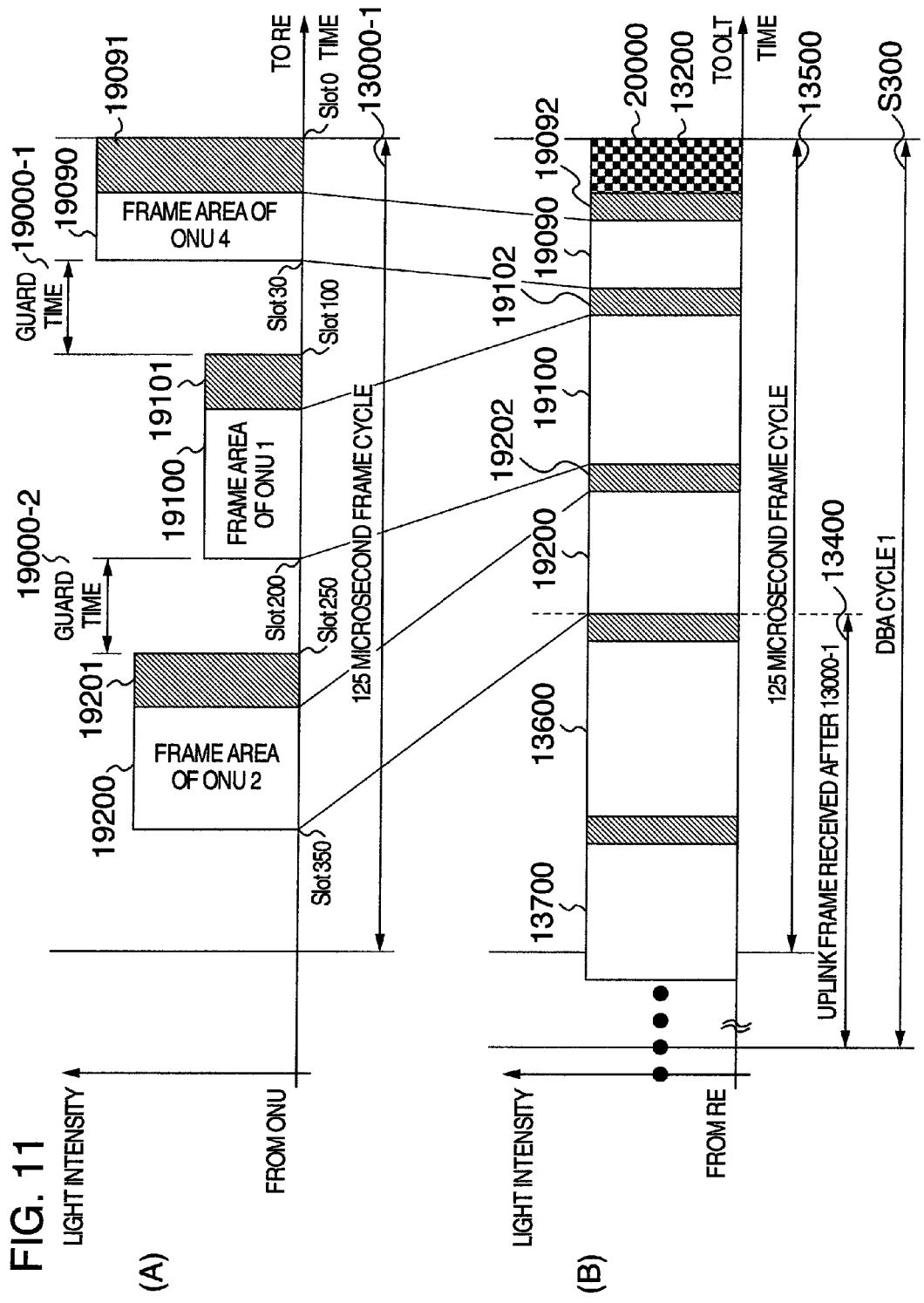

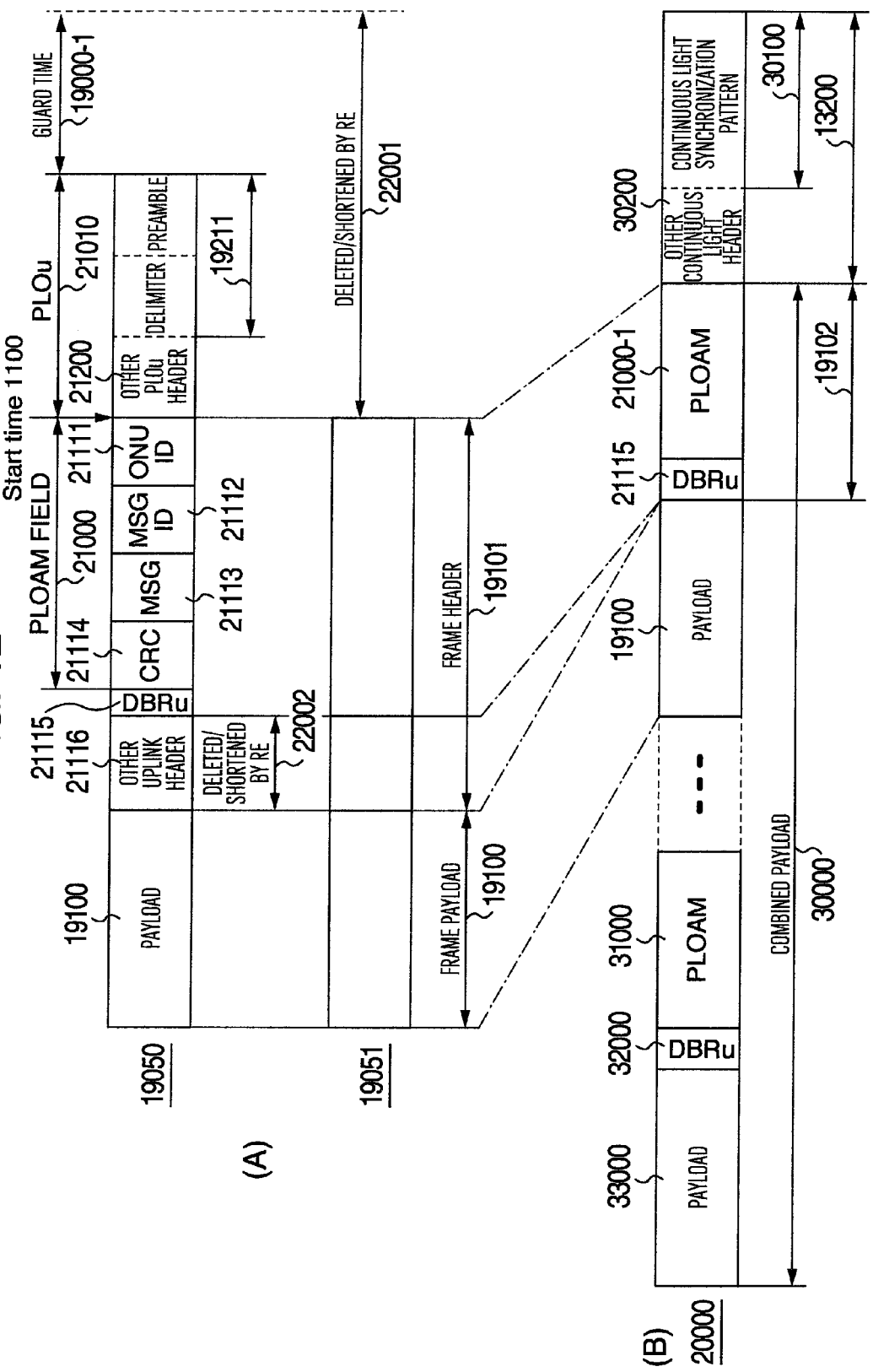

OPTICAL COMMUNICATION SYSTEM AND COMMUNICATION BANDWIDTH CONTROL METHOD

INCORPORATION BY REFERENCE

The present application claims priority from Japanese applications JP2009-236792 filed on Oct. 14, 2009, the content of which is hereby incorporated by reference into this application.

BACKGROUND OF THE INVENTION

The present invention is directed to the configurations of an optical communication system in which a plurality of optical line units share an optical transmission line, and the methods of operating the same. In particular, the present invention relates to the configuration of an optical communication system excellent in system expandability, such as the capability to extend the transmission distance of the system and the capability to increase the number of accommodated subscribers, and the method of operating the same.

With an increasing demand for communications utilizing a broadband, the access line for users is shifting to a large-capacity access line using an optical fiber, in place of the access techniques based on the telephone line, such as DSL (Digital Subscriber Line). Today, as an access network, a PON (Passive Optical Network) system (hereinafter, may be simply referred to as a PON, or an optical passive network system or passive optical network system) is often used from the viewpoints of the line installation cost and maintenance cost. This PON is now being standardized by various standardization organizations, including International Telecommunication Union Standardization Sector (hereinafter, referred to as ITU-T). One example is G-PON (Gigabit PON) standardized by ITU-T Recommendation G. 984.3, etc.

The PON is a system, wherein an optical signal is transmitted and received by branching and multiplexing the optical signal between an optical line terminal (hereinafter, referred to as an OLT or a master station) and a plurality of optical network units (hereinafter, referred to as ONUs or slave stations) using an optical fiber and an optical splitter. Because the performance, such as the attenuation amount of an optical signal passing through the optical fiber, is limited by the transmission performance of the optical fiber to be used and the number of optical branches in the optical splitter, the PON has a limitation in the communication distance between the OLT and the ONU. For example, in the case of G-PON, the communication distance is set to 20 km at the maximum and the number of branches by the optical splitter (the number of ONUs which can be coupled to the OLT) is set to 64 at the maximum.

With an increase in the opportunities for subscribers (communication network users) in households to access the Internet and carry out communication for the purpose of information collection or social life, there is a need to increase the number of communication network facilities, such as the number of access networks which couple subscribers to the communication network. For this reason, a method of additionally introducing a PON itself used in the access network, i.e., adding an OLT, or a method of expanding the number of ONUs which an OLT of a PON accommodates may be considered. In a PON, usually, an OLT performs a complicated system-control, such as a bandwidth control, or the management of accommodated ONUs. Here, the OLT is much more expensive than the ONU. Moreover, the cost for newly installing an optical fiber leads to a major expenditure to a carrier. Therefore, it is usually preferable to increase the number of accommodated ONUs per an OLT rather than to additionally install an OLT.

The introduction of a reach expander (hereinafter, referred to as an RE), which is used for extending the communication distance of an optical fiber or increasing the number of branches, into the existing PON is under study. The RE is appropriately installed within an optical signal communication interval between an OLT and an ONU and this RE is controlled from the OLT, thereby achieving an extension of the communication distance of an optical fiber or an increase in the number of branches. Note that a control protocol has been standardized by ITU-T based on a proposal of using the OMCI (ONU Management Control Interface) which is the existing ONU control protocol (see ITU-T Recommendation G. 984.4).

SUMMARY OF THE INVENTION

In the case of introducing an RE into an PON, although there are a method of inserting the RE in a trunk fiber (also referred to as a line-concentration optical fiber) which each ONU shares between an OLT and an optical splitter, and a method of inserting the RE in a branch optical fiber used between an optical splitter and each ONU, the method of inserting the RE in a line-concentration optical fiber may be preferable from the viewpoint of the easiness of control.

By inserting the RE in a trunk optical fiber, the communication distance is extended further than the conventional PON and therefore the ONU of a subscriber existing in a remote place also can be accommodated in the same OLT, thus facilitating an increase in the number of accommodated ONUs of the OLT. That is, the ONU accommodation efficiency in the OLT will improve. On the other hand, with an extension of the communication distance, the communication time (transmission delay time) between a remote ONU and an OLT will increase. As a result, the S/N ratio of a signal transmitted from the ONU to the OLT attenuates or the waveform is distorted, and therefore an optical signal receiver exhibiting high-performance in the signal processing in the OLT is required.

In allocating a communication band from an OLT of a PON to an arbitrary ONU by using time-division multiplex, the OLT receives a transmission band request from each ONU via a splitter, and performs dynamic bandwidth allocation (hereinafter, referred to as DBA) based on this request. If the communication distance is simply extended, the bandwidth allocation request from the ONU to the OLT may not be precisely transmitted due to the influence of wavelength dispersion or degradation in S/N ratio or a signal may not be transmitted to the OLT at all due to the significance of the signal lost over an optical fiber. As a result, the waiting time after each ONU sends a transmission request and until it acquires a transmission permission becomes long, and the communication interruption (standby) time of each ONU will increase. That is, the quality of the signal required to have a real time nature is affected, or the channel capacity (bandwidth) allocation to each ONU by the DBA becomes inaccurate, or it takes time to perform detection processing on the signal from the ONU (i.e., the detection processing load is applied to the OLT), and therefore the periodic interval of bandwidth allocation may increase more than necessary.

Accordingly, when the communication distance between an OLT and an ONU is extended or the number of accommodated ONUs is increased by introducing an RE into a PON, the PON capable of preventing the occurrence of the problems, such as (1) an increase in the signal-processing load in the OLT, (2) an increase in the signal transmission waiting time in each ONU, (3) a decrease in the transmission signal bandwidth from each ONU, and (4) a degradation in the quality of a transmission signal, the PON preferably having the communication quality substantially equal to that of the conventional PON, needs to be provided. More specifically, it is an object of the present invention to provide a PON capable of suppressing the occurrence of the above-described problems in order to perform DBA required in the PON, and a method of controlling the PON, and a bandwidth allocation method.

In order to solve the above-described problems, an optical communication system (PON) of the present invention, in performing DBA in response to the uplink signal transmission requests transmitted from a plurality of slave stations (ONUs), performs a first DBA processing in an OLT and a second DBA processing in RE by utilizing both a master station (OLT) and an RE. Specifically, in the OLT, a data amount which can be transmitted from each ONU is determined. Next, in the optical reach extender (RE), in order for the ONU to transmit the data amount determined in the OLT, a data transmission timing (a transmission start time and a transmission data amount, or a transmission start time and a transmission completion time) is determined so as to avoid data collision between ONUs by using a time division multiplex method. The PON of the present invention includes a DBA function as described above.

That is, an RE which relays a signal to be transmitted and received between an OLT and a plurality of ONUs is provided in an optical fiber network interval of an optical communication system in which the OLT is coupled to the ONU through an optical fiber network including an optical splitter. A bandwidth control section which allocates a bandwidth for dynamically transmitting an uplink signal to the ONU is provided in both the OLT and the RE. The OLT determines the width of a time frame, in which communication can be performed, (the data amount which can be transmitted) for each ONU based on the requests from a plurality of ONUs. In the RE, a timing for the respective ONUs to transmit a signal to the OLT is determined with reference to this information. In this optical communication system, uplink burst signals transmitted from a plurality of ONUs are multiplexed in the optical fiber network and are further reconstructed into a long cycle burst signal in a continuous light form or a long cycle burst signal near to continuous light in the RE, and is transferred to the OLT.

More specifically, the RE is inserted in a line concentration fiber interval in which the OLT is coupled to the optical splitter. The RE includes a measurement section which measures the transmission distance or the transmission time between the RE and the ONU, a determination section which, based on a transmission bandwidth request from the ONU, determines a timing for this ONU to transmit a signal, and a signal processing section which processes a signal received from the ONU and transmits the resulting signal to the OLT. When the OLT receives a signal transmission request from the ONU, the OLT determines a data amount (the width of a communication time frame) which the ONU can transmit at a certain time interval (hereinafter, may be referred to as a logical DBA cycle or a first DBA cycle), while the RE determines a time instance at which each ONU can transmit a signal in a physical DBA cycle (hereinafter, may be referred to as a second DBA cycle) shorter than the logical DBA cycle of the OLT. The RE controls the signal transmission timing from the ONU based on the logical DBA cycle and the physical DBA cycle so as to transmit the signal to the OLT in a form of a continuous signal, with a guard bit portion included before and after a burst signal going from the ONU to the OLT and a part of the received frame information deleted. Furthermore, a burst frame extending over the existing DBA (including communication timing determination) processing cycles is made available, so that the communication bandwidth of an uplink signal between the master station and the slave station is more effectively used.

When the communication distance between an OLT and an ONU is extended and the number of accommodated slave stations is increased by introducing an RE in a PON, the RE (1) reproduces an uplink signal, and converts this signal into a continuous signal or converts this signal into a format near to a continuous optical signal as a long cycle burst signal, and relays the resulting signal to the OLT, and furthermore (2) performs a processing related to a time division multiplexing processing of the DBA processing, and thereby unnecessary information including an uplink inter-frame guard band transmitted from the ONU can be prevented from being sent to the OLT. This increases the bandwidth use efficiency over the line-concentration optical fiber.

Moreover, in a downlink signal transmitted from the OLT, the DBA processing is divided and processed between the OLT and the RE, and therefore the processing load on the OLT side is reduced and the load of the uplink bandwidth allocation processing with respect to the respective ONUs can be reduced, and an increase in the number of ONUs can be coped with.

By terminating and reproducing an uplink optical signal by the RE, the system can be expanded while keeping the centralized-control form in the OLT which is the characteristic of the PON. Specifically, the RE includes a function to process a physical signal taking into consideration the optical characteristic, and the OLT includes a function to process a logical signal used for the bandwidth allocation, the ONU management, and the like, so that the signal processing in an expanded system can be optimized.

Other objects, features and advantages of the invention will become apparent from the following description of the embodiments of the invention taken in conjunction with the accompanying drawings.

BRIEF DESCRIPTION OF THE DRAWINGS

FIG. 10A is a memory configuration diagram showing a configuration example of a database used in DBA processing.

FIG. 10B is a memory configuration diagram showing a configuration example of another database used in the DBA processing.

FIG. 11 is a signal configuration diagram showing a configuration example of an optical signal transmitted and received by the RE.

FIG. 12 is a signal configuration diagram showing another configuration example of an optical signal.

DETAILED DESCRIPTION OF THE EMBODIMENTS

Hereinafter, the configuration and operation of a PON system according to the present invention will be described using the accompanying drawings, with the configuration and operation of a G-PON specified by ITU-T Recommendation G984.3 as an example.

Figure 1:
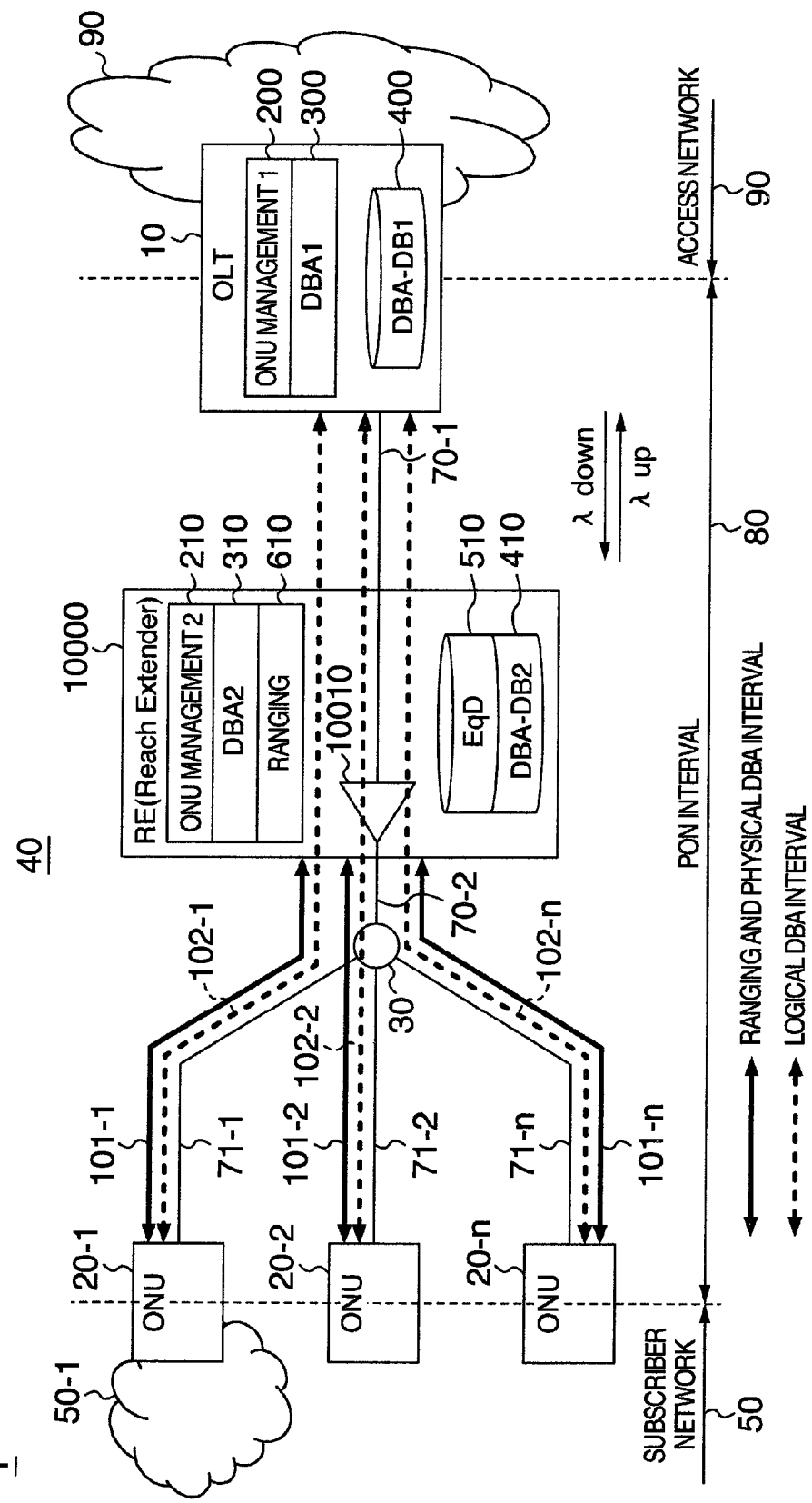
FIG. 1 is a network configuration diagram showing a configuration example of an optical access network using a PON of the present invention.

FIG. 1 is a network configuration diagram showing a configuration example of an optical access network using the PON of the present invention, and shows a configuration example when an RE is inserted into a line-concentration optical fiber of the PON.

A PON 40 comprises an optical line unit (OLT) 10, a plurality of optical network units (ONUs) 20-1-20-$n$, an optical splitter 30, a line-concentration optical fiber 70, a plurality of branch optical fibers 71-1-71-$n$, and a reach extender (RE) 10000 inserted between line-concentration optical fibers 70-1 and 70-2 in the middle of the line-concentration optical fiber 70. In the PON 40, an optical access network 1 is a network, wherein each of the ONUs 20-1-20-$n$ is coupled to a subscriber network (or a terminal, such as PC or a telephone; here, only a subscriber network 50-1 is illustrated as a representative example) 50, and wherein the OLT 10 is coupled to an access network 90 which is a higher-level communication network. The OLT 10 is a communication device including an interface to both a PON interval 80 and the access network 90, and is a device which transmits and receives an information signal by transmitting and receiving the information with respect to a further higher-level communication network via the access network 90 and furthermore transferring this information to the ONU 20. Note that, although a packet communication network comprising an IP router, an Ethernet (the registered trademark) switch, and the like is often used for the access network 90, a communication network other than this may be used. Usually, the ONU 20 is installed in a user's home or a company site and is coupled to the subscriber network 50 which is a LAN or a network equivalent thereto. Information terminals, such as an IP telephone, a telephone terminal providing the existing telephone service, and a PC/portable terminal, are coupled to each subscriber network 50. In a PON interval 80, communication is performed using an optical signal between the OLT 10 and each of the ONUs 20-1-20-$n$. Note that, in the PON, the used wavelengths, i.e., $\lambda$up in the uplink and $\lambda$down in the downlink, of an optical signal are set to differ from each other, so that the signal may not interfere in the optical fibers 70 and 71 or in the splitter 30.

A downlink signal transmitted from the OLT 10 passes through the RE 10000, and is branched by the splitter 30, and the branched signals respectively reach the ONUs 20-1-20-$n$ constituting the optical access network 1. The downlink signal from the OLT 10, taking the G-PON as an example, is transmitted using a frame (hereinafter, referred to as a GEM frame; G-PON Encapsulation Method frame) which is used for communication in the PON interval 80. This GEM frame comprises a header and a payload, wherein an identifier (Port-ID) of the ONU 20 which is the destination of each GEM frame is inserted in each header. Upon receipt of the GEM frame, each of the ONUs 20-1-20-$n$ extracts header information of this GEM frame, and if the destination Port-ID of the GEM frame is addressed to this ONU 20 itself, this ONU 20 performs a frame processing, while if it is a frame addressed to the other ONU 20, this frame is discarded.

For all the uplink communication from the respective ONUs 20-1-20-$n$ to the OLT 10, an optical signal with the same wavelength $\lambda$up is used. The uplink signal is a variable-length frame (hereinafter, also referred to as the GEM frame) comprising a header for each ONU and a payload, as with the downlink signal. Each ONU 20 transmits an uplink signal while shifting its transmission timing so that the GEM frame from each ONU 20 can be distinguished in the OLT 10 (i.e., so that the respective uplink signals may not collide/interfere over the line-concentration optical fiber 70). These uplink signals are time-division multiplexed over the line-concentration optical fiber 70 after passing through the splitter 30, and reach OLT 10.

Specifically, (1) the distance from the RE 10000 to each of the ONUs 20-1-20-$n$ is measured by a ranging processing section 610 so as to adjust a delay amount (a difference in the response time between the ONUs) of an uplink signal, and (2) with an instruction (a downlink signal) from the OLT, each of the ONUs 20-1-20-$n$ is instructed to notify the amount of data waiting for transmission (Refer to 102-1-102-$n$). (3) Based on this notification, the OLT 10 indicates the data amount, which can be transmitted as the uplink signal, to each of the ONUs 20-1-20-$n$. Note that the above-described (2) and (3) are performed by a DBA-1 processing section 300. (4) In the RE 1000, a DBA-2 processing section 310, based on a transmission permissible data amount determined by the OLT 10, allocates a timing, at which the relevant data can be transmitted, to each ONU wherein the delay amount of an uplink signal is adjusted based on the ranging processing. (5) After each ONU 20 transmits the data at the timing indicated by the RE 10000, these signals are time-division multiplexed over the line-concentration optical fiber 70 and reach the RE 10000. (6) Since the RE 10000 knows the timing indicated to each ONU 20, it distinguishes the signal of each ONU 20 from the multiplexed signal and performs reception processing on this signal.

In order to realize these operations, a transmission permissible data amount for each ONU (for each bandwidth management unit Alloc-ID in terms of the operation) is recorded in a DBA-DB 1 (400) held in the OLT 10, while in a DBA-DB 2 (410) of the RE 10000, this data is associated with a communication start time and a communication completion time (or the communication start time and communication data amount), i.e., the timings during which the ONU should transmit (the RE 10000 can receive) the data and holds these associated data.

The RE 10000 includes an optical relay function 10010 for relaying an optical signal transmitted from the OLT 10 to the ONU 20 and an optical signal transmitted from the ONU 20 to the OLT 10. The optical relay function 10010 usually includes: a unit for directly amplifying a received signal and transmitting the amplified signal by an optical amplifier; and a unit for restoring the received optical signal into an electric signal once and confirming the content of the signal and performing the required processings, including termination and frame insertion, and subsequently converting the processed signal into an optical signal again and transmitting the same, wherein these units are alternatively used depending on the characteristic of a signal to be transmitted and received. In the RE 10000 used in the PON 40 of the present invention described below, a signal processing to execute a part of the ranging and DBA processings which the conventional OLT includes is required and therefore the received optical signal is once converted into an electric signal and processed.

In the PON 40 of the present invention, a ranging processing section 610 of the RE 10000 executes the ranging processing which the OLT 10 conventionally performed, and furthermore the DBA-2 processing section 310 of the RE 10000 is in charge of a part of the DBA processing. This is for preventing an increase in the control signal processing time executed by the OLT 10 and RE 10000 with regard to the PON interval 80 which has been extended by the RE 10000. Specifically, as shown in FIG. 1, in the PON 40 of the present invention, the ranging in intervals 101-1-101-*n* between the RE 10000 and each ONU 20 is performed. The result of ranging is stored in a ranging (EqD) database 510 which the RE 10000 includes. With reference to this database, the result of ranging is supplied for the operations of the DBA, PON 40, and the like.

Upon detection of a newly coupled ONU, the RE 10000 measures a round trip delay (hereinafter, referred to as an RTD) from the RE 10000 to each of the ONUs 20-1-20-*n* by ranging process. The RE 10000 calculates an equivalent delay (hereinafter, referred to as an EqD) to be set to each of the ONUs 20-1-20-*n* from this RTD, and stores this EqD into an EqD information database (DB) 510. The EqD is set according to a EqD setting procedure of the existing PON so that the response time from each ONU 20 with respect to the RE 10000 may be identical within the system. As the ranging which this RE 10000 performs, the ranging method specified by ITU-T Recommendation G. 984.3 may be used. Depending on the installation location of the RE 10000, in a configuration wherein the ranging is performed from the RE 10000 to each ONU 20, assuming a total length of the line-concentration optical fiber 70-2 and each branch optical fiber 71 is not greater than 20 km, then even if the distance of the PON interval 80 is attempted to be extended to not less than 20 km by extending the line-concentration optical fiber 70-1 by introducing the RE 10000, the same ranging as that of the conventional PON may be performed by the RE 10000 during operation of the PON 40, thus preventing an increase in the processing load for the OLT to manage all ONUs associated with the extension of the PON interval 80.

The EqD information and RTD are held in advance in the EqD information DB 510 of the RE 10000 so as to be able to correctly receive an uplink signal when the RE 10000 performs the bandwidth allocation with respect to each ONU 20.

Figure 2:
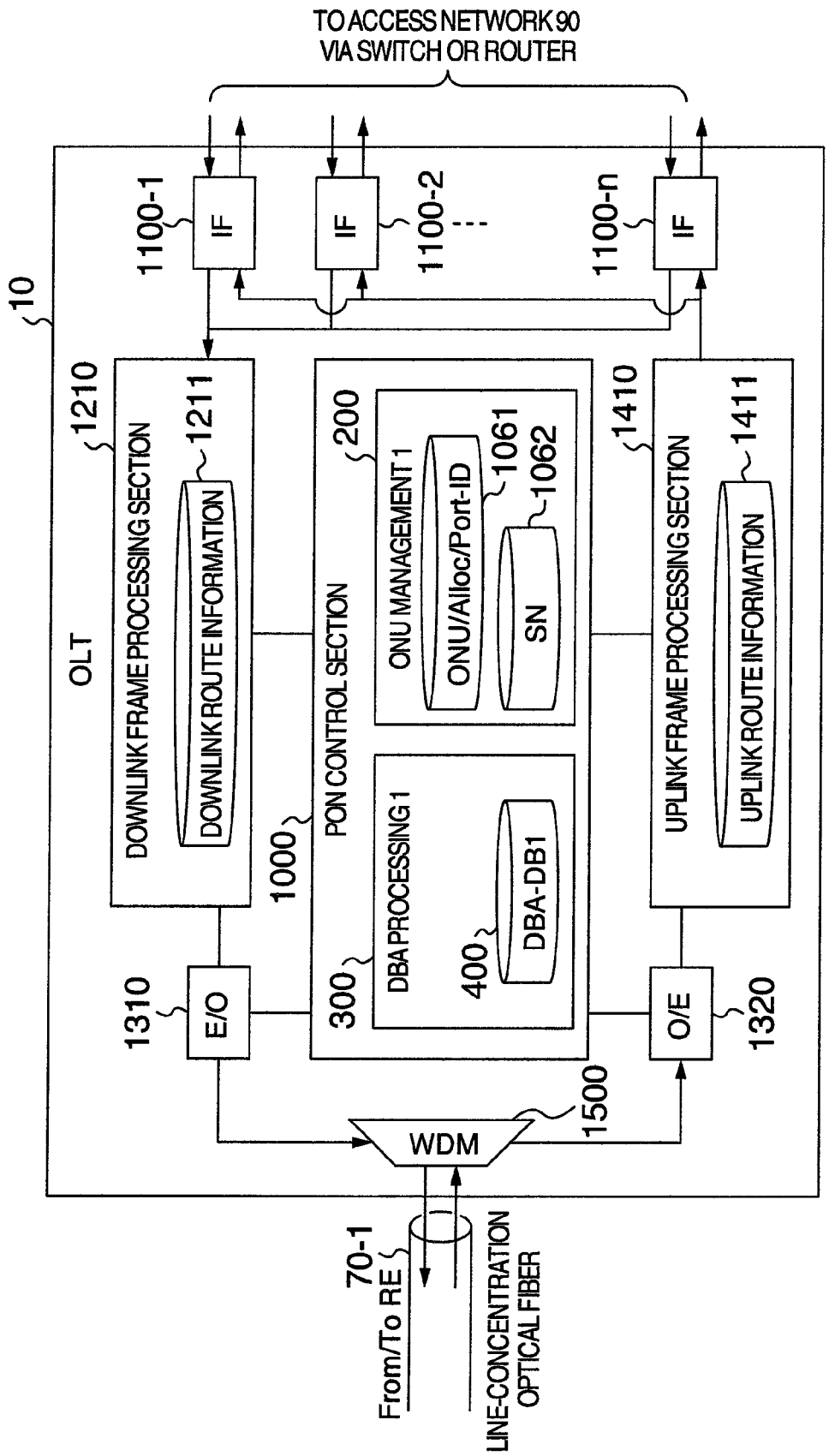
FIG. 2 is a block diagram showing a configuration example of an OLT of the PON.

FIG. 2 is a block diagram showing a configuration example of the OLT of the PON.

A downlink signal is input from the access network 90 to IF 1100-1-1100-*n* called SNI (Service Network Interface). Note that a packet network is often used for the access network 90 and the Ethernet interface of 10/100 Mbps or 1 Gbps is often used for IF, however, the present invention is not limited to this configuration. A reception signal (hereinafter, may be referred to as data or a packet) is transferred to a downlink frame processing section 1210, where header information of the packet is analyzed. Specifically, based on a flow identifier including destination information, transmission source information, and route information contained in the header of the packet, the destination ONU 20 to which this reception packet is to be transferred is determined. Along with the determination of this destination information, the conversion or giving of the header information of the reception packet is performed, as needed. Note that the downlink frame processing section 1210 includes a downlink route information DB 1211 for determining the processings, including the destination determination and the conversion and giving of the header information described above, wherein the above-described processings are performed with reference to the DB 1211, with one or more parameters included as the header information of the reception packet as a trigger.

The downlink frame processing section 1210 also includes a frame generation function to convert the reception packet into a frame format for transmission in the PON interval 80. The specific processings in transmitting the reception packet of Ethernet to the PON interval 80 of G-PON are as follows. (1) Extract the header information of the Ethernet packet, and (2) by searching the downlink route information DB 1211 in the downlink frame processing section 1210 with this header information as a trigger, a VLAN tag processing (conversion, deletion, transparency, or giving) with respect to the reception packet and the destination of the reception packet are determined. (3) Furthermore, generate a GEM header including a Port-ID set to the corresponding destination ONU using the frame generation function, and (4) this GEM header is given to the reception packet and the resulting Ethernet packet is encapsulated as the GEM frame.

The GEM frame encapsulating the Ethernet packet is read from the downlink frame processing section 1210, and is converted from an electric signal to an optical signal in an E/O processing section 1310, and is furthermore transmitted to the ONU 20 via a wavelength demultiplexer (WDM) 1500 and line-concentration optical fiber 70-1.

In the PON interval 80, each ONU 20 transmits an uplink signal at the timing specified by the RE 10000. This uplink signal is a burst-like signal to be intermittently transmitted from each ONU 20, and the uplink signal from each ONU 20 is time-division multiplexed over the line-concentration optical fiber 70-2, and is received by the RE 10000. The RE 10000 converts these burst signals into a continuous light form, and transmits this to the OLT 10 via the line-concentration optical fiber 70-1. The OLT 10 performs bit synchronization and frame synchronization (frame termination of the PON interval 80) processings based on a pattern called a preamble and delimiter to be given to the start position of this continuous optical signal which is received via the line-concentration optical fiber 70-1 and WDM 1500. That is, the burst-like uplink signal from each ONU 20 is converted into a continuous light form, and is received by the OLT 10. Thus, the OLT 10 always receives a signal with a substantially constant intensity, and therefore, as compared with the conventional PON, a component responding to the intensity level of the reception light signal is not required in configuring the receiver of an uplink optical signal and a reduction in cost can be achieved. An example of the frame structure of a continuous optical signal which the OLT 10 receives at this time will be described later.

An uplink signal having been subjected to the termination processing in the O/E processing section 1320 is transferred to an uplink frame processing section 1410, and is processed in accordance with a procedure substantially opposite to the processing procedure of the downlink signal described earlier. Specifically, the GEM frame is terminated by the uplink frame processing section 1410, and is restored to the Ethernet packet. Moreover, the uplink frame processing section 1410 includes an uplink route information DB 1411, wherein the analysis or conversion of the header information is performed with reference to this DB, as with the downlink signal, and the destination of the packet is determined. Furthermore, the uplink frame processing section 1410 also includes a frame generation function to convert the frame format of the reception packet into a packet format which can be transmitted and received via the higher-level access network 90, as with the downlink frame processing section 1210. On the contrary to the downlink signal, this is a function to convert the GEM frame for transmission in the PON interval 80 into the Ethernet packet. The Ethernet packet is transmitted from the uplink frame processing section 1410 via IF 1100-1-1100-$n$ to the access network 90 including an L2 switch and a router.

A PON control section 1000 is a section which performs the control, such as the setting and management of each ONU 20 as well as the overall control of the PON 40 including the RE 10000. In this embodiment, since the RE 10000 performs the ranging and a part of the DBA processing (hereinafter, referred to as a physical DBA processing or a DBA-2 processing), the OLT 10 includes an ONU management-1 section 200 for operating in cooperation with the RE 10000, and a DBA-1 processing section (hereinafter, may be referred to as a logic DBA processing section) 300 including a function to determine and hold an uplink signal transmission amount in order to give a transmission permission to each ONU. When the start position of a received uplink signal has been confirmed by the synchronization processing of the uplink signal in the uplink frame processing section 1410, the PON control section 1000 extracts the information (ONU-ID or Port-ID in the case of G-PON) for identifying the ONU from the header information of the received uplink frame and confirms the sender. Moreover, the information for terminating the GEM frame for transmission in the PON interval 80 and converting the same into the Ethernet format is provided to the uplink frame processing section 1410.

The ONU management-1 section 200 includes a function to manage and control the ONUs 20-1-20-$n$ and RE 10000 coupled under the OLT 10 based on the signal reception state from each ONU 20 or RE 10000 and the header information included in the reception frame. Here, the state of the ONU 20 means whether or not the ONU 20 is coupled to the OLT 10, or whether it is in the middle of starting up or in the operation state, whether or not it can communicate normally, and these states are managed. Specifically, a serial number (SN) assigned in advance to each ONU is stored in an SN DB 1062, while the ONU-ID, Alloc-ID, and Port-ID which the OLT 10 allocates to each ONU 20 are stored in an ONU/Alloc/Port-ID DB 1061. Of course, these parameters are just examples, and in addition to these parameters, the parameters required for controlling the PON may be stored, and these DBs may be put together into one DB or may be subdivided into three or more DBs.

Figure 3:
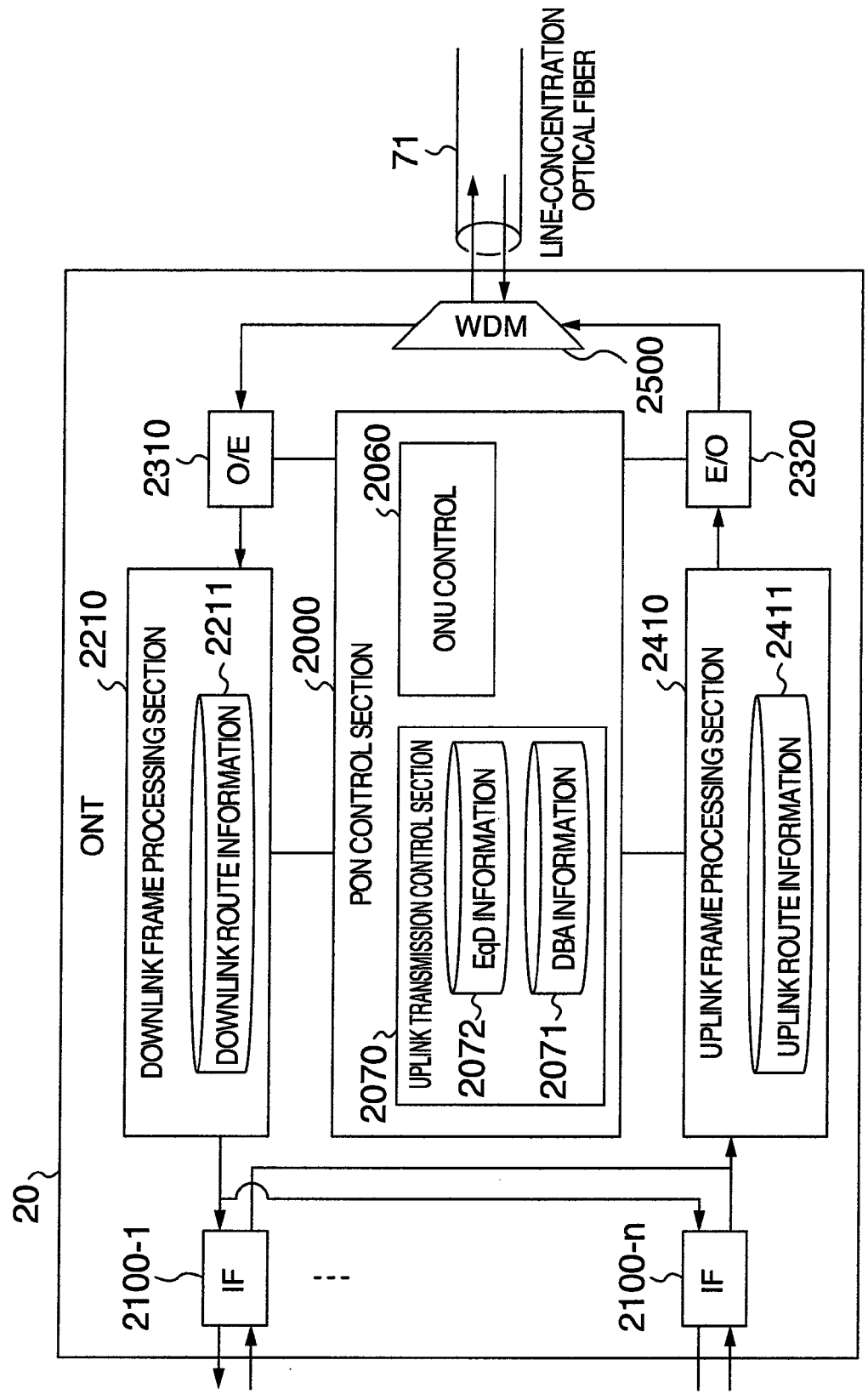
FIG. 3 is a block diagram showing a configuration example of an ONU of the PON.

FIG. 3 is a block diagram showing a configuration example of the ONU of the PON.

An uplink signal from a terminal (not shown), which the ONU 20 accommodates, to the PON is input from the subscriber network 50 to IF 2100-1-2100-$n$ called UNI (User Network Interface). Note that, a LAN or a packet network is often used also in the subscriber 50, and the Ethernet interface of 10/100 Mbps or 1 Gbps is often used in the IF, however, the present invention is not limited to this configuration.

The configuration and operation for processing the downlink signal and uplink signal in the ONU 20 are substantially the same as the configuration and operation of the uplink signal and downlink signal processing of the OLT 10, respectively. That is, for the downlink signal, a downlink frame processing section 2210 including a downlink route information DB 2211 converts the GEM frame received from the PON interval 80 via $1n$ O/E processing section 2310 into the Ethernet packet, and outputs this to a terminal to be coupled to the UNI of the ONU 20, while for the uplink signal, an uplink frame processing section 2410 including an uplink route information DB 2411 converts the Ethernet packet received from the terminal into the GEM frame, and outputs this toward the OLT 10 via an E/O processing section 2320. The PON control section 2000 includes an uplink transmission control section 2070 and an ONU control section 2060.

The uplink transmission control section 2070 includes an EqD information DB 2072 for storing the value of EqD which is notified from the RE 10000 based on the ranging, and a DBA information DB 2071 for storing the results (signal transmission starting position/time and timing, a transmission amount, and the like) of the DBA which the RE 10000 performed. The values stored in these databases, in accordance with an uplink communication transmission instruction sent by the OLT 10 or RE 10000, are referred to by the uplink frame processing section 2410 as the reference information in transmitting information at a correct timing (a timing to time-division multiplex so as not to overlap with a signal of other ONU 20 in the RE 10000), and in accordance with this reference information, an uplink signal is transmitted from the frame processing section 2410 toward the OLT 10.

The ONU control section 2060 is a functional block used for the parameter setting or communication state management in starting up the ONU 20 in accordance with an instruction from the OLT 10 or RE 10000. For example, the processings of this block include the analysis of the reception frame, the management of device maintenance control information, the determination whether or not communication (reply) to the OLT 10 or RE 10000 is required, and the like.

Figure 4:
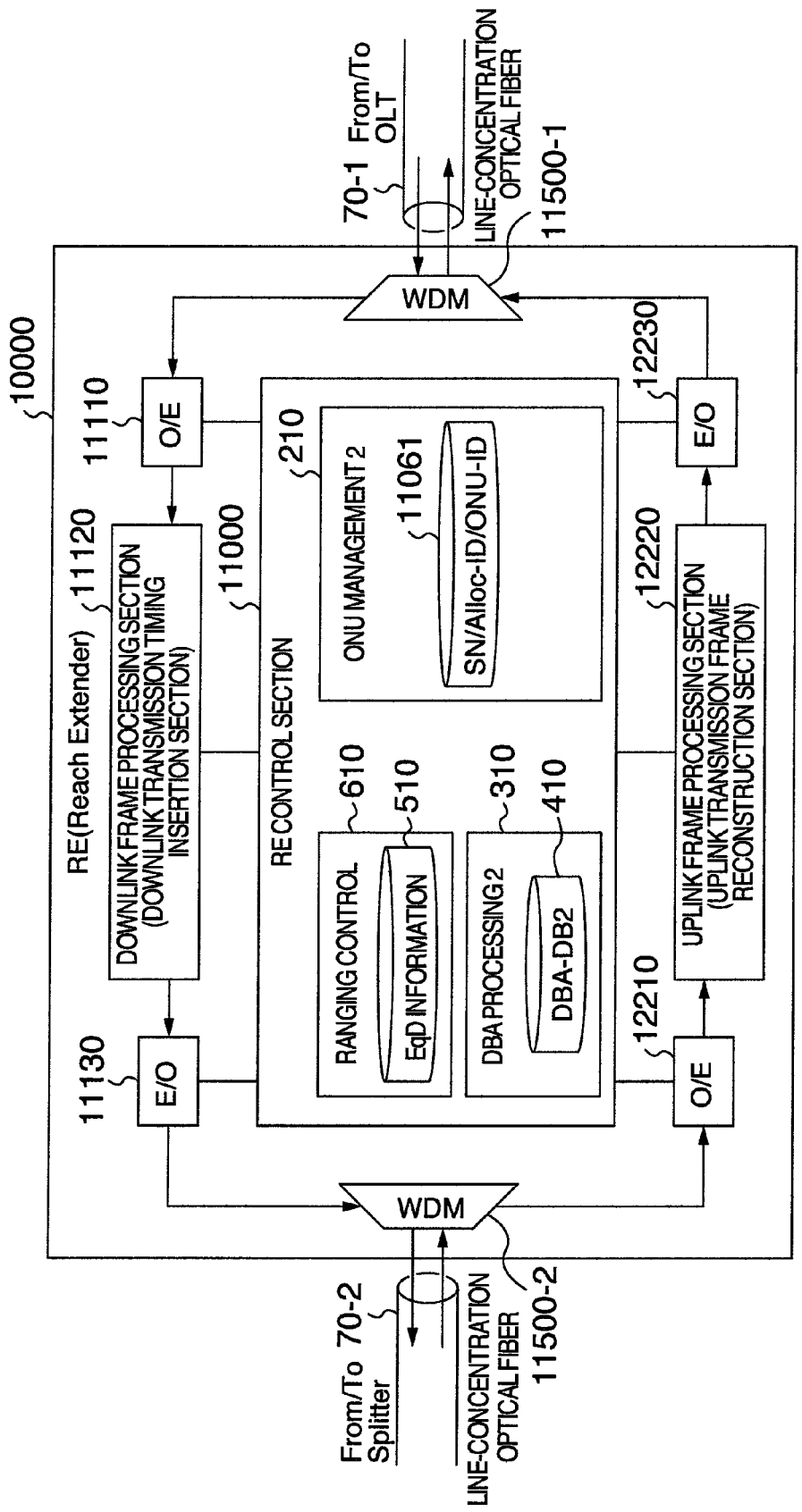
FIG. 4 is a block diagram showing a configuration example of an RE provided in the PON of the present invention.

FIG. 4 is a block diagram showing a configuration example of the RE included in the PON of the present invention.

In this embodiment, the RE 10000 is inserted in the line-concentration optical fiber 70 in the PON interval 80. That is, the OLT 10 and RE 10000 are coupled to each other by the line-concentration optical fiber 70-1, while the RE 10000 and the splitter 30 are coupled to each other by the line-concentration optical fiber 70-2. The RE 10000 is inserted in order to maintain the performance as the PON even if the line-concentration optical fiber 70-1 is extended to accommodate the ONU 20 remote from the OLT 10.

The RE 10000 includes an O/E processing section 11110 for downlink signal reception and an E/O processing section 11130 for downlink signal transmission. In addition, the RE 10000 includes an O/E processing section 12210 for uplink signal reception and an E/O processing section 12230 for transmission. Upon receipt of a downlink signal and an uplink signal via a WDM 11500-1 and a WDM 11500-2, respectively, the frame is synchronized and terminated, as with the OLT 10 and ONU 20. Since the received optical signal is converted into an electric signal once, the header processing of a received frame and the confirmation of the frame information are possible in the downlink frame processing section 11120, uplink frame processing section 12220, and RE control section 11000. Moreover, as with the OLT 10 and ONU 20, the information generated in the RE control section 11000 can be transmitted as the frame to the OLT 10 or ONU 20 through the downlink frame control section 11120 or the uplink frame control section 12220. In addition, the examples of the information transmitted from the RE 10000 include a ranging response request message which is transmitted in order to perform the ranging with respect to the relevant ONU 20 when the ONU 20 is newly coupled. On the other hand, the examples of information terminated in the RE 10000 include a response message from the ONU 20 in response to this ranging response request.

The RE control section 11000 includes a ranging control section 610, an ONU management-2 section 210, and a DBA processing-2 section 310.

The ranging control section 610 is a section which performs the ranging with respect to the intervals 101-1-101-$n$ between the RE 10000 and ONU 20, and includes an EqD information DB 510 for storing the RTD with respect to each ONU 20 measured by the ranging and the EqD calculated from this RTD. Moreover, the ranging control section 610 includes a function to notify the relevant ONU 20 of a modification of the EqD setting and at the same time modify the EqD information of the ONU 20 if the start position of the signal received by the RE 10000 shifts from a reception scheduled position (scheduled time).

An ONU identifier for recognizing the ONU 20 whose distance is to be measured by the ranging control section 610 is held in the ONU management-2 section 210. Specifically, the ONU management-2 section 210 includes an SN/ONU-ID information DB 11061, wherein SN information, which the currently coupled ONU 20 has, and an ONU-ID and Alloc-ID SN assigned to this ONU 20 by the OLT 10 are associated with each other. By including the database 11061, whether or not the relevant signal has been transmitted at a time indicated from the RE 10000 to the ONU 20 can be confirmed for each Alloc-ID, and if the RE 10000 side determines that re-adjustment of the time is required, the processing therefor can be performed. Furthermore, the database 11061 can be used to instruct to adjust the optical transmission intensity of the relevant ONU if the light intensity is insufficient upon receipt of an uplink signal in the RE 10000 or if the light intensity is stronger by a certain value or more as compared with an assumed appropriate light intensity.

The operations of the RE 10000 are as follows. (1) The data transmission timing is determined by the DBA-2 processing 310 and notified to each ONU so that each ONU 20 can transmit data to the OLT 10 based on the transmission data amount permitted from the OLT 10 to each ONU 20 by the DBA-1 processing 300, and (2) an uplink signal from the ONU 20 received from the line-concentration optical fiber 70-2 side is converted into a continuous optical signal via the line-concentration optical fiber 70-1 after a certain intra-device delay, and is transmitted to the OLT 10 side as the optical signal with a certain intensity. Therefore, the OLT 10 does not need to respond to each burst signal, so that the configuration of the optical signal receiver can be simplified.

The O/E processing section 12210 knows, in advance, the timing to receive an uplink signal coming from each ONU 20 by referring to a DBA information 11071 stored in a DB 410 provided in the DBA processing-2 section 310. According to this timing, the O/E processing section 12210 adjusts the ATC and light intensity level setting circuit so as to be able to receive a signal with an appropriate S/N ratio and at an appropriate light intensity for each burst signal coming from each ONU 20. The DBA processing-2 section 310 includes a function (not shown) to store an uplink bandwidth request included in then uplink signal from the ONU 20. This function is for holding a request value until the DBA processing 2 is completed and the bandwidth allocation is completed in response to the bandwidth request from each ONU. In the DBA processing 2, the processing to allocate the bandwidth according to the bandwidth request, other priority, and the like is performed within a certain cycle, and therefore a time lag may occur after the bandwidth request is issued by each ONU 20 and until the actual bandwidth allocation is completed, or a case may occur where a sufficient bandwidth cannot be allocated within a certain DBA cycle depending on the requested bandwidth amount and even an allocation within the next DBA cycle is required. Therefore, the relevant request information needs to be stored while the DBA processing is continuing.

Furthermore, in the DBA-2 processing section 310, the transmission permissible bandwidth (data amount) information with respect to each ONU 20 which is notified as a result of the execution of the DBA-1 processing 300 from the OLT 10 is recorded. This information can be obtained by calculating the bandwidth which can be allocated to the ONU 20, upon receipt of an uplink bandwidth request included in the uplink signal from the ONU 20 in the OLT 10. This information will be held, with respect to the relevant ONU 20, until the reception of uplink signals corresponding to the relevant bandwidth allocation is completed through one or more times of DBA processings. Note that the above-described uplink bandwidth request and transmission permissible bandwidth are stored appropriately in the DB 410 or the like.

The uplink burst signal normally received by the O/E processing section 12210 is processed by the uplink frame processing section 12220 as follows. When the RE 10000 and OLT 10 transmit and receive a signal as a continuous optical signal, the deletion or compaction processing is performed on the signal areas used for burst synchronization (guard time, preamble, delimiter) belonging to the header of the relevant frame. Moreover, as another frame processing method in the frame processing section 12220, a method may be employed wherein in transferring a signal from the RE 10000 to OLT 10, the signal is converted into a frame format, which can be terminated by the OLT 10, different from the uplink burst frame. The advantage of this method is that an inexpensive transmission/reception device supporting the existing general-purpose protocol can be mounted in the OLT 10. For example, the frame structure may be converted so that the RE 10000 and OLT 10 using the VSM frame of Ethernet OAM can communicate with each other.

Figure 5:
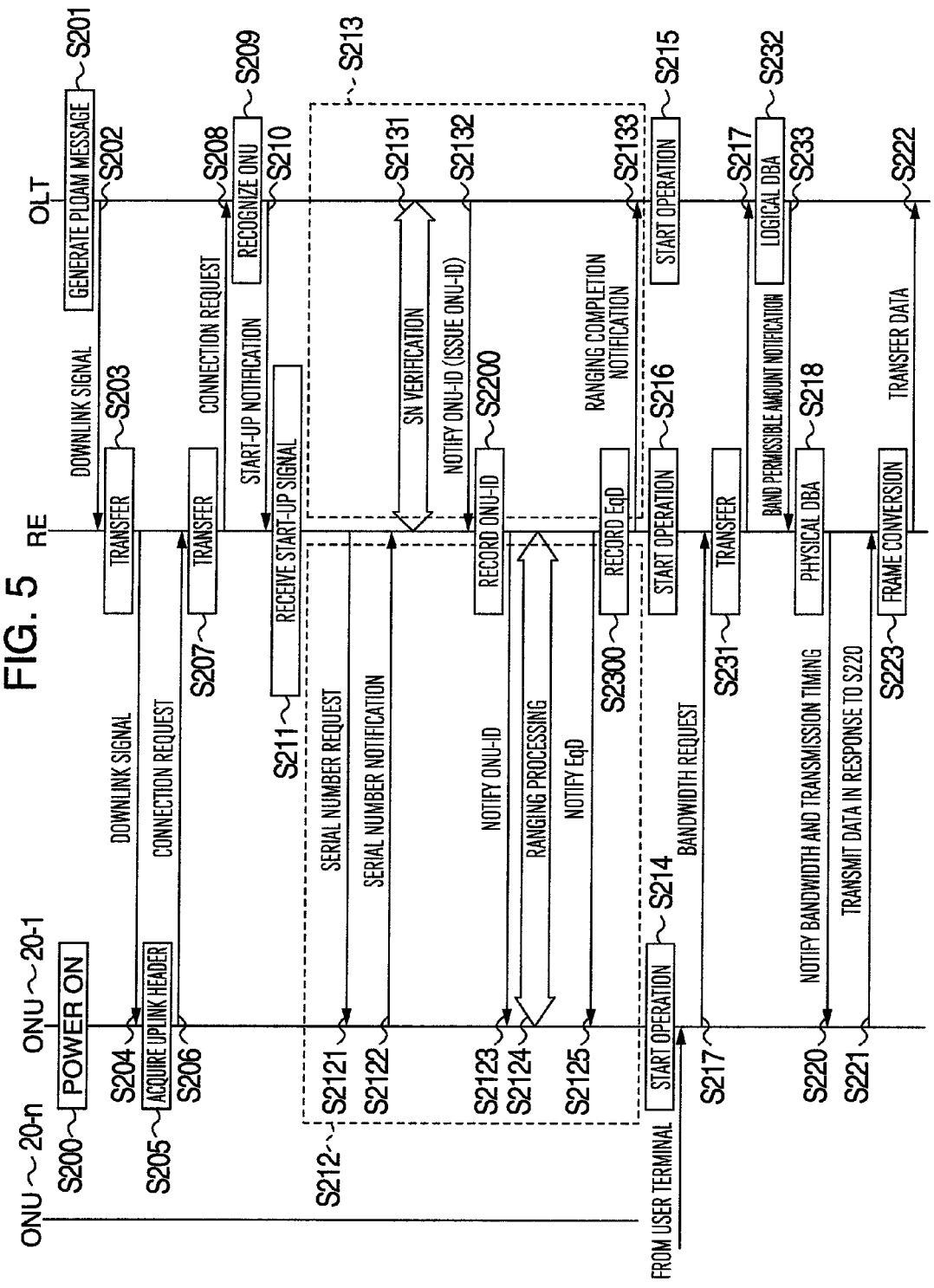
FIG. 5 is a sequence diagram (1) showing an operation example of the PON of the present invention.

FIG. 5 is an operation sequence diagram showing an operation example of the PON of the present invention, and is a diagram showing an example of the operation processing in the processing and operation state when the OLT 10 starts up the ONU 20 via the RE 10000.

When the RE 10000 is started up and the communication between the OLT 10 and RE 10000 becomes possible, the start-up processing of the ONU 20 is started as follows, based on the ONU start-up method compliant with ITU-T Recommendation G. 984.3.

In the OLT 10, in order to find a newly coupled ONU 20, a PLOAM message is generated at an appropriate time interval (S201) and this message is transmitted to the ONU 20 (S202) until the number of accommodated ONU 20's reaches the maximum capacity. In the RE 10000, this PLOAM message is subjected to a transfer processing (S203), and is transmitted to each ONU 20 (S204). Specifically, this PLOAM message is broadcasted to all ONUs, and the ONU requiring this signal receives and processes this signal.

When powered-on (S200), the ONU 20-1 newly coupled to the OLT 10 starts to receive a downlink signal transmitted via the RE 10000 from the OLT 10 (S204), and then upon recognition of the message requesting for the connection to the OLT 10 (S205) from the header information included in the downlink signal S204, the ONU 20-1 transmits a connection request message toward the OLT 10 (S206). The RE 10000 performs a transfer processing on this connection request message (S207), and transmits the resulting message to the OLT 10 (S208).

Since the RE 10000 of the present invention uses the ONU start-up method specified by ITU-T Recommendation G. 984.3, the ONU 20 can see the OLT 10 only when the OLT 10 comes to the position of the RE 10000, and thus the same performance can be maintained with the same control method as that of the existing PON.

When the OLT 10 recognizes that the ONU control section 1060 has received an uplink signal from the new ONU 20 and this ONU 20 has been newly coupled correctly (S209), the OLT 10 starts the start-up of the corresponding ONU 20-1.

Specifically, the OLT 10 transmits a start-up notification message to the RE 10000 so as to start the start-up processing of the corresponding ONU 20-1 (S210).

Upon receipt of the start-up notification (S210) from the OLT 10 (S211), the RE 10000 operates like the OLT specified by ITU-T Recommendation G. 984.3 and starts the start-up processing of the ONU 20-1 (S212, S213).

Upon receipt of the start-up signal S210 from the OLT 10, the RE 10000 terminates this message and transmits an SN request signal S2121 which the RE 10000 newly issues. In response to this, the ONU 20-1 transmits to the RE 10000 an SN notification signal S2122 including SN set in its own device. After receiving SN, an SN verification processing S2131 is performed in an interval 100 between the RE 10000 and OLT 10.

Upon confirming that the SN received from the ONU 20-1 is correct, the OLT 10 issues an ONU-ID as the identifier assigned to the ONU 20-1. This ONU-ID is inserted into a downlink communication message, and is notified to the RE 10000 (S2132), and furthermore is transferred from the RE 10000 to the ONU 20-1 (S2123). Moreover, this ONU-ID is stored into the DB 11061 of an ONU management section 11060 of the RE 10000 (S2200), and is used for the subsequent operations. This is stored because a frame having the ONU-ID as the parameter needs to be set for the purpose of associating the ONU identifier with the EqD information and for the purpose of using the existing PLOAM frame.

Once a correspondence between the new ONU 20-1 and ONU-ID can be confirmed by the ONU management-2 section 210 in the RE 10000, the RTD between the ONU 20-1 and RE 10000 is measured by ranging processing (S2124). With regard to this processing, the ranging control section 610 of the RE 10000 may perform the same operation as the ranging by the OLT specified by ITU-T Recommendation G. 984.3. In the RE 10000, after the EqD to be allocated to this ONU 20 is determined from the RTD measurement result, the value of this EqD is stored into an EqD-DB 510 of the ranging control section 610 (S2300), and the value of this EqD is notified to the ONU 20-1 (S2125). In the ONU 20-1, the value of this EqD is stored into the EqD information DB 2072, and is used for the operations of the subsequent signal transmission and reception and the like. Moreover, after the storage processing of the EqD into the EqD-DB 510 is completed, the RE 10000 transmits to the OLT 10 a ranging completion notification to notify that the ranging processing with respect to this ONU 20-1 has been completed (S2133).

Upon receipt of the notification concerning the connection management of the ONU 20 from the RE 10000 through the ranging completion notification S2133, the operation sequence transitions to the operation state of this ONU 20. The ONU 20-1 enters an operation state S214, and the RE 10000 and OLT 10 also transition to an operation start state (S216, S215). In this manner, the state transition of the OLT 10 and ONU 20 at both ends of the PON interval 80 is synchronously performed.

After the ONU 20-1 transitions to the operation state, the ONU 20-1 transmits an uplink signal bandwidth request S216, and the RE 10000 receives this transmission request. The RE 10000 transfers this request information to the OLT 10 (S231, S217). Upon receipt of this uplink bandwidth request, the OLT 10 accordingly determines, in the DBA processing-1 section, the communication bandwidth allocation amount (transmission permissible data amount) of a transmission permissible uplink signal with respect to each ONU 20 within a DBA cycle (hereinafter, referred to as a DBA cycle 1 or a first DBA cycle) which the OLT 10 manages (logical DBA, S232). The transmission permissible data amount calculated by the OLT 10 is notified to the RE 10000 (S233). With reference to the transmission permissible data amount of each ONU 20 obtained from the OLT 10, the RE 10000 determines, within a DBA cycle (hereinafter, referred to as a DBA cycle-2 or a second DBA cycle) which the RE 10000 manages, a timing at which each ONU 20 transmits an uplink signal toward the RE 10000 (physical DBA, S218). This timing information is inserted, by the downlink frame processing section 11120 of the RE 10000, into a BWmap (Bandwidth Map) field (the details of which is described later in a field 1500 in FIG. 9) included in the header portion of the downlink signal, and is transmitted to the ONU 20 (S220). The ONU 20-1 which received this information transmits an uplink signal according to the timing and transmission amount indicated by the RE 10000 (S221). This uplink signal is terminated by the RE 10000, and is converted into a continuous optical signal (20000 in FIG. 11(B)) directed for the OLT (S223) as described later using FIGS. 11(A), (B) etc., and then this continuous optical signal reaches OLT 10 (S222).

Note that, a series of processings described above including the uplink bandwidth request (S216) from the ONU 20, the logic DBA-1 processing S232 in the OLT 10, the physical DBA processing S218 in the RE 10000, and the uplink signal bandwidth notification to the ONU 20 (S220) are periodically repeated. According to the DBA processing for every cycle, with regard to an optical signal received from the ONU 20, in the RE 10000 a comparison with a value stored in each EqD information DB 11051 is performed to confirm the reception timing for each uplink signal (uplink frame). In the ONU 20, when the bandwidth allocation is performed, i.e., when the data transmission permission is acquired, the uplink signal is transmitted according to this transmission instruction (S221). If a shift is detected in the reception timing in the RE 10000, the value of EqD is modified or the ranging is redone.

As shown in the above procedure, in the PON of the present invention, the parameters, such as SN and ONU-ID for managing the connection states of the ONUs 20-1-20-n, and the transmission permissible band amount to the ONU 20 (and the algorithm, priority, and the like used in DBA) are managed by the OLT 10, while the RE 10000 is in charge of the ranging portion of the ONU 20 start-up procedure, and the physical DBA processing after starting the operation. Thus, as with the existing PON, the interval in which the physical DBA is performed becomes between the RE and ONU even when the PON interval 80 is expanded while holding the ONU 20's centralized control (including the uplink signal communication control from the ONU) function in the OLT 10, and therefore the PON can be operated with a reduced amount of data buffers to be mounted in the ONU 20 (without increasing the amount of data buffers).

Figure 6:
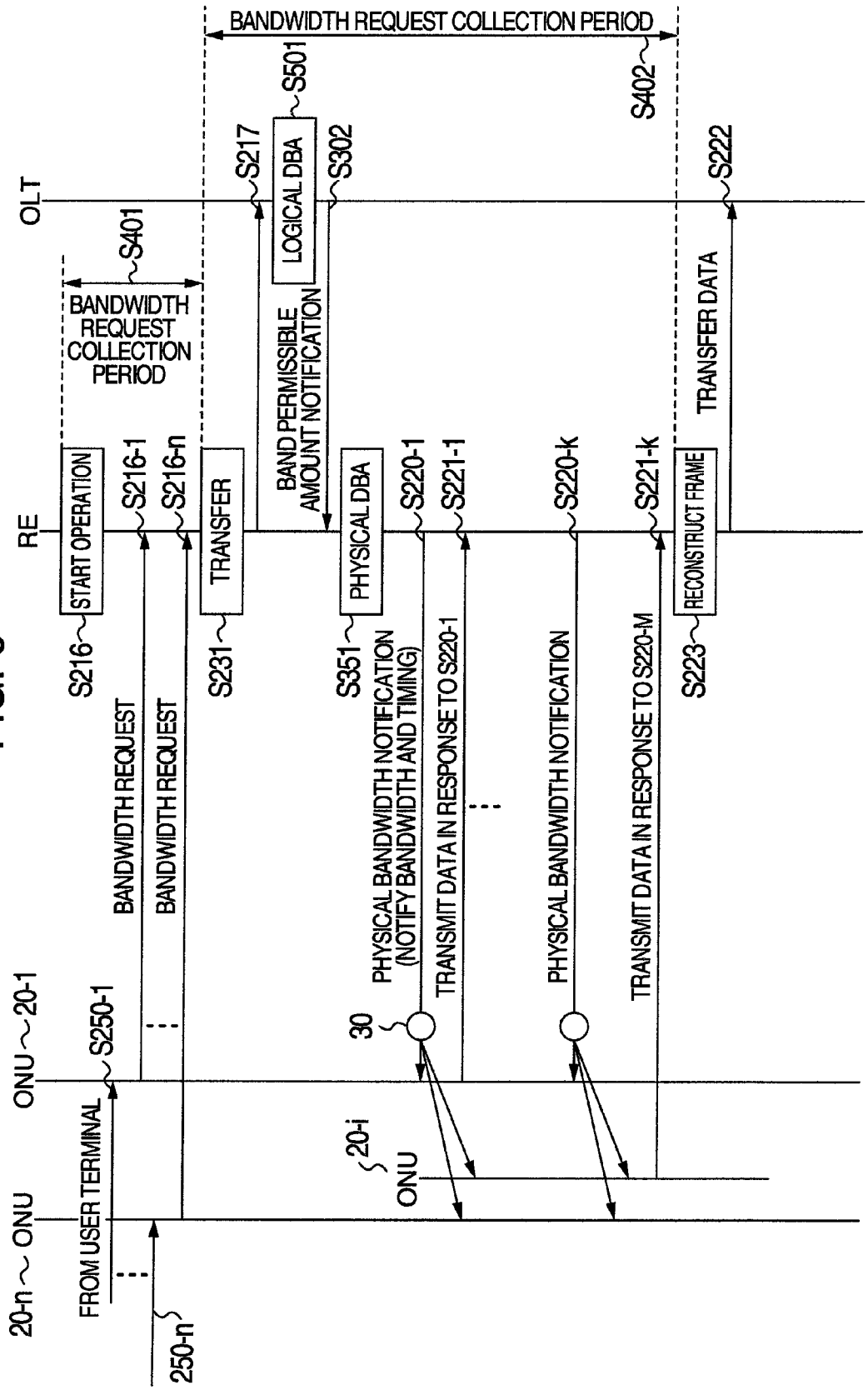
FIG. 6 is a sequence diagram (2) showing an operation example of the PON.

FIG. 6 is a sequence diagram illustrating an operation example of the PON, and illustrates an operation example of the signal transmission and reception by the DBA. This diagram shows a communication procedure between the ONU 20 and OLT 10 when the physical DBA cycle performed in the RE 10000 is shorter than the logical DBA cycle performed in the OLT 10.

The ONU 20 receives data from a user terminal within the subscriber network 50 coupled to each ONU (250). Once transmission waiting data is stored in the uplink frame processing section 2410 in the ONU 20, the ONU 20 transmits uplink bandwidth allocation requests S216-1-S216-n according to the stored amount. Note that the bandwidth request S216 from each ONU 20 is transmitted according to the transmission timing assigned to the ONU 20 by the RE 10000.

The RE 10000 sets a certain period (S401, S402) as the bandwidth request collection period, and puts together the bandwidth requests (S216-1 to S216-*n*) which are received from the ONU 20 during this period, and reconstructs an uplink signal and periodically transfers the resulting uplink signal to the OLT 10 (S231, S217).

Upon receipt of this bandwidth request, the OLT 10 performs bandwidth allocation for the DBA-1 processing section 310 so as to permit uplink communication to each ONU 20 within the logical DBA cycle (logical DBA, S501). At this time, the information determined as the band information is the amount of data (transmission permissible data amount) permitted for each ONU 20 to transmit within the logical DBA period, and does not include specific information on the timing at which the signal is transmitted. Note that, although the details is described in FIG. 11, since the header added to the burst data (GEM frame) transmitted from each ONU 20 is deleted in converting the uplink signal from the RE 10000 to OLT 10 into a continuous optical signal, the continuous optical signal can be transmitted to the OLT 10 by increasing the data by this deleted portion. Accordingly, the data amount, which is permitted for each ONU 20 to transmit by the logical DBA, is determined so as to be a value larger than the bandwidth (data amount) determined by the DBA of the conventional PON, taking into consideration the amount of the deleted header. The DBA-2 processing section 310 of the RE 10000 is in charge of determining the uplink signal transmission timing of each ONU 20, while the DBA-1 processing section 300 of the OLT 10 is in charge of allocating the amount of data, which can be communicated over a fiber coupling the OLT 10 and RE 10000, to each ONU 20 within the logical DBA cycle. The data amount allocated for each ONU 20 is transmitted to the RE 10000 as a band permission amount notification, for each logical DBA cycle (S302).

The RE 10000 which received the band permission amount notification S302 from the OLT 10 stores an uplink transmission permissible data amount with respect to each ONU 20 into the DBA-2 processing section 310, and starts a transmission timing allocation process with respect to each ONU 20 (physical DBA, S351). FIG. 6 shows a situation where the logical DBA cycle of the OLT 10 corresponds to k times of the physical DBA cycle of the RE 10000. The RE 10000 transmits, k times (S220-1-S220-*k*), to each ONU a bandwidth notification (notification of the actual bandwidth and transmission timing) for transmitting data from each ONU 20 within the logical DBA cycle of the OLT 10, and notifies each ONU 20. Note that, as with the logical DBA in the OLT 10, also in the physical DBA of the RE 10000, in expectation that the header added to the burst data (GEM frame), which is transmitted from each ONU 20 in converting an uplink signal in the RE 10000, is deleted, the data is increased by this deleted portion to determine the amount of data which each ONU 20 transmits at one time and its timing. Then, the transmission data amount and timing in each ONU 20 are determined so that the amount of data output from each ONU 20 by k times of physical DBA within the logical DBA cycle becomes the transmission permissible data amount determined by the logical DBA. That is, in order to increase the bandwidth use efficiency of the PON by transmitting a lot of data to the OLT 10 when the GEM frame from each ONU 20 has been converted into a continuous signal with the header and the like deleted in the RE 10000, the data amount permitted for each ONU 20 to transmit and the timing are determined also by the physical DBA, taking into consideration the amount of the deleted header, so as to be a value larger than the bandwidth (data amount) determined by the DBA of the conventional PON.

When the reception of the data corresponding to the bandwidth notification S302 of the OLT 10 is completed as the uplink signals S221-1-S221-*k*, the RE 10000 converts the data from the ONU into a data format required for the communication with the OLT 10, and reconstructs a frame including the uplink data (S223), and transfers the same to the OLT 10 (S222).

Usually, the logical and physical DBA processings are repeated for every cycle. For this reason, the respective header portions of the uplink signals S221-1-S221-*k* from the ONU 20 include a bandwidth request (S216) to request for uplink data transmission in the next logical DBA cycle. These bandwidth requests S216 are put together in the RE 10000 as described above, and are transferred from the RE 10000 to the OLT 10, as with the steps S235 and S217, and in the OLT 10 the sequence moves to the logical DBA processing in the next cycle based on this request information. That is, in the uplink signal processing S217 and the data transfer processing S222, the same signal structure is used.

Figure 7:
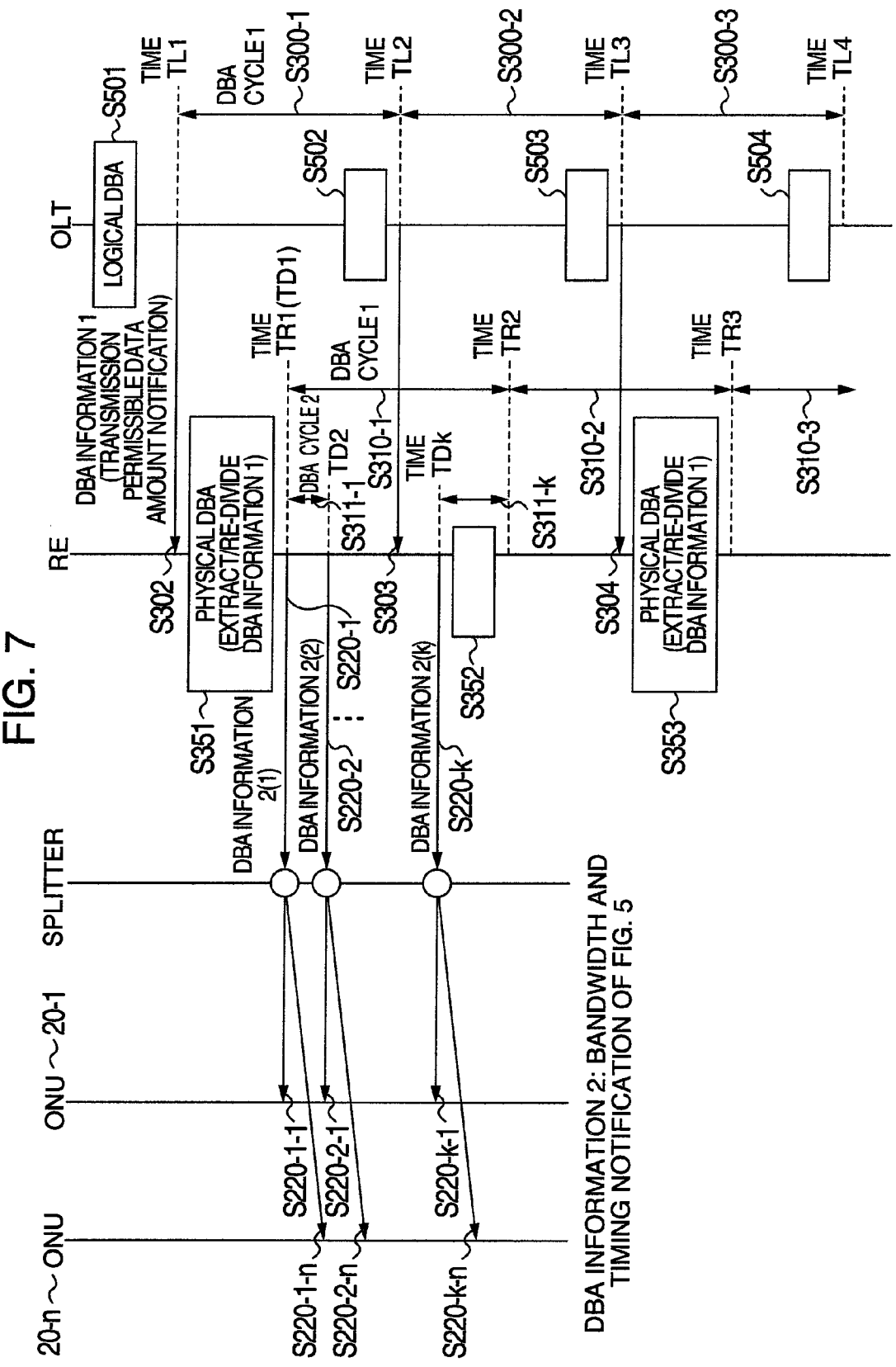
FIG. 7 is a sequence diagram (3) showing an operation example of the PON.

FIG. 7 is also a sequence diagram illustrating an operation example of the PON, and illustrates the operation of FIG. 6 in detail, showing a specific operation procedure between the OLT 10 and RE 10000 in performing the bandwidth allocation with respect to the ONU 20.

In a logical DBA (S501), the OLT 10, based on the bandwidth request (S216, S217 in FIG. 6) information from the ONU 20 which have been received by this time, allocates to each ONU 20 an uplink bandwidth which can be transmitted and received within the DBA cycle 1 (logical DBA cycle). The data transmission amount for each ONU 20 calculated in the DBA processing-1 section 300 is stored into the DBA-DB1 (400), and is notified as the DBA information-1 to the RE 10000 at a time instance TL1 (S302). An example of the frame structure of the notification S302 is described later.

The RE 10000 which received the DBA information-1 (S302) performs a physical DBA (S351) based on the DBA information-1. Specifically, the transmission permissible data amount for each ONU 20 acquired from the DBA information-1 is divided, and the bandwidth (data amount) which is permitted to be transmitted by a one-time instruction and the timing thereof are determined as the DBA information-2 for each ONU 20 so as to be addressed to each ONU 20 and meet the DBA cycle-2. This diagram shows an example, wherein the DBA information-1 (S302) is divided into k DBA cycle-2's by the RE 100000 to indicate the bandwidth to the ONU 20.

From the RE 10000 to the ONU 20, the DBA processing-2 section 310 notifies each ONU 20 of the DBA information-2 by utilizing the bandwidth notification section compliant with ITU-T Recommendation G. 984.3 via the splitter 30. The DBA information-2(1)-2(*k*) transmitted from a time instance TR1 (TD1) toward the ONU 20 are the notification frames. These bandwidth indication frames are sent to the ONU 20 for each DBA cycle-2 (S311-1-S311-*k*) by the physical DBA described in FIG. 6. The bandwidth indication to each ONU 20 is transmitted at time instances TD1-TD*k*, respectively. Note that the DBA cycle-2 does not need to be the same as the cycle of the basic cycle frame (125 microseconds in the G-PON) of the PON, and an interval suitable for the physical DBA processing can be set. That is, the bandwidth control of a longer cycle may be performed by bundling a plurality of basic cycle frames. The DBA information-2(1)-2(*k*) are branched by the splitter 30 and reach each ONU 20. FIG. 7 shows a situation where the downlink frame S220-1 including the DBA information-2(1) is distributed to S220-1-1-S220-1-*n* after passing through the splitter 30, and reach all ONU 20's. This operation is also the same in the other frames S220-2-S220-*k* indicating the DBA information 2. The ONU 20, when the DBA information is determined as the bandwidth indication addressed to its own device, transmits the uplink signal to the RE 10000 according to the timing and data amount indicated by the downlink frame. After transmitting the bandwidth indication at TD1-TDk, respectively, the RE 10000 receives a burst signal which is sent by time-division multiplex after a certain time including EqD which is set during the start-up of the ONU 20. Note that the reception of the uplink data which is instructed to be transmitted in one DBA cycle-2 is completed within the time width of the DBA cycle-2. Then, the determination of the transmission permissible data amount in the logical DBA and the determination of the data amount and transmission timing in the physical DBA are performed taking into consideration the conversion (a part of the header of the GEM frame from each ONU 20 is deleted and converted into a continuous signal) of an uplink signal in the RE 10000, so that the amount of data which is transmitted from each ONU 20 by k times of physical DBA equals to the transmission permissible data amount of each ONU 20 determined by the logical DBA, thereby allocating a wider bandwidth than in the DBA of the conventional PON and improving the bandwidth usage efficiency of the PON system.

The header information which is given to the burst signal from each ONU 20 in transmitting uplink data includes an uplink bandwidth transmission request in the next DBA cycle. That is, the RE 10000 receives an uplink frame corresponding to the DBA information-2 notification S220 and at the same time performs the process to collect the band information as described in FIG. 6. With respect to the indication given at each DBA cycle 1 (S310-1-S310-3), the time taken until the processing of the data and the transmission requests from the respective ONU 20's is completed becomes the same time width as the DBA cycle 1. The DBA cycle 1 is applied to the OLT 10 and RE 10000, and the cycle boundary differs in the respective devices. This is because the timing at which the uplink data or the bandwidth request from the ONU 20 is received, the processing time for performing the corresponding band division processing for the DBA cycle 1, the intra-device processing time for notifying the above-described timing and processing time by the downlink signal and the uplink signal between the OLT 10 and the RE 10000, and the communication time over the optical fiber 70-1 are required. For example, the boundary position of the DBA cycle 1 shifts from the time TL1 to the time TR1 by the amount of the logical DBA (S501) and downlink communication time (S302). This time difference (TR1-TL1) keeps a constant value also with regard to the other boundaries. On the other hand, the uplink signal also operates based on the DBA cycle 1 while keeping a constant time difference. S352 of FIG. 7 indicates the same DBA information extraction/re-division processing as that of S351 and S353. Moreover, S502, S503, and S504 indicate the same processing as those of the logical DBA (S501).

Figure 8:
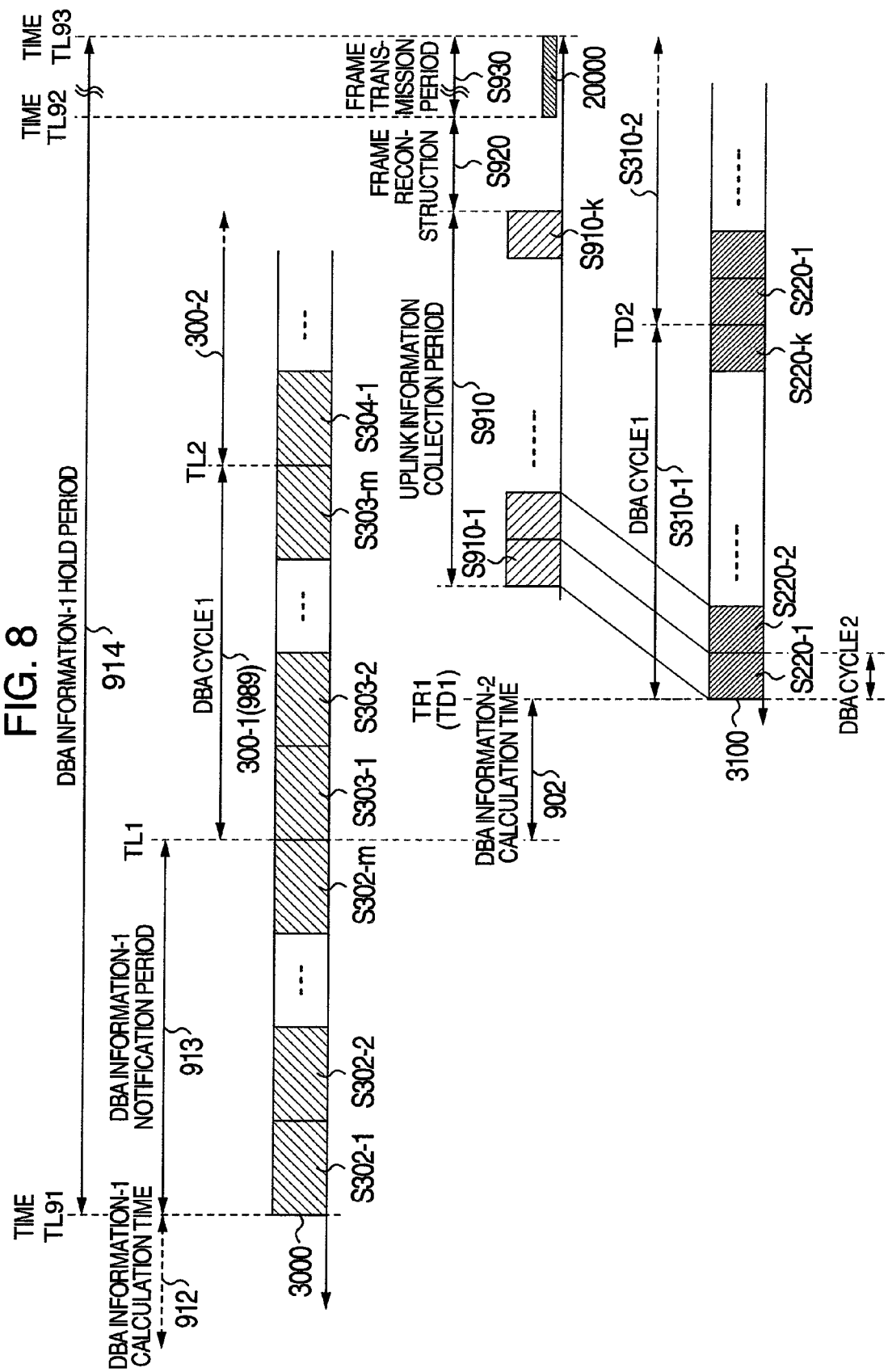
FIG. 8 is a timing chart showing an operation example of the PON.

FIG. 8 is a timing chart showing an operation example of the PON, and is a diagram showing the transmission/reception timings of signals associated with each DBA processing (300, 310) performed by the OLT 10 and RE 10000. The OLT 10 notifies the RE 10000 of the data amount which can be transmitted from each ONU 20 to the OLT 10 in a DBA information-1 notification period 913 (corresponding to the DBA cycle 1 (S300)) of a constant cycle. For this notification, the structure of the OAM (PLOAM) which the existing PON includes is utilized. Specifically, this is the structure utilizing the signal (3100 in FIG. 9) specified by ITU-T Recommendation G. 984.3, wherein the transmission permissible data amount is notified using a US BWmap field (1500 in FIG. 9) included in a downlink signal frame 3100 which time-division multiplexes the uplink signal from the ONU 20. Of course, the other technique, for example, the VSM (Vendor Specific Message) frame specified in Ethernet OAM Standard (ITU-T Recommendation Y.1731) may be used.

The OLT 10 collects the bandwidth request information from each ONU using a method, wherein the RE 10000 collectively transfers the requests from the respective ONU 20's (S216-1-*n*, S231, S217 in FIG. 6) with the DBA cycle 1 (S300) as the reference cycle. Based on the bandwidth request (information notified in S216) received from each ONU 20, the OLT 10 determines the ratio for dividing the uplink bandwidth available in one DBA cycle 1 (S300) into the uplink bandwidths for the respective ONU 20's, taking into consideration the priority and the like of the user and service, when required. Thus, the data amount which each ONU 20 is permitted to transmit is determined (logical DBA (S501) is performed). This chart shows the transmission/reception timings of the signals related to the DBA processing after performing the logical DBA (S501) during a transmission data amount calculation time 912 and until the DBA information 1 (transmission permissible data amount notification) is transmitted to the RE 10000 (S302) and the OLT 10 receives an uplink signal (a signal 20000 after converted into a continuous optical signal) from each ONU 20 during time instances TL92 and TL93.

The transmission permissible data amount (DBA information 1) to each ONU 20 calculated during the DBA information-1 calculation time 912 by the OLT 10 is notified to the RE 10000 in the next DBA information-1 notification period 913 (during time instances TL91 and TL1, corresponding to the DBA cycle 1 (S300, 989)). Specifically, the DBA information 1 is put into the PLOAM of the downlink signal frame by the OLT 10, and is notified using m downlink signal frames (S302-1-S302-*m*). The downlink frames S302-1-S302-*m* divided into multiple frames are transmitted to the RE 10000 in the form of continuous light without discontinuing the boundary between the respective frames, as with the downlink frame of the existing PON.

The RE 10000 which received these downlink frames (hereinafter, collectively referred to as a downlink frame 3000) performs the physical DBA (S315) based on the DBA information 1. The processing time of the DBA-2 processing 310 performing the physical DBA is indicated by a DBA information-2 calculation time 902. Subsequently, the RE 10000 transmits the DBA-2 information (the bandwidth and transmission timing notification to each ONU 20) to the ONU 20 from the boundary time TR1 (TD1) of the DBA cycle 1. For transmission of the DBA-2 information from the RE 10000 to the ONU 20, the signal specified by ITU-T Recommendation G. 984.3 is used, as in the existing PON. Specifically, the notification of communication timing is performed using the US BWmap field included in the downlink signal frame for time-division multiplexing the uplink signal from the ONU 20. The DBA cycle-2 is applied to this downlink DBA cycle. Then, the physical DBA (S200-1-S200-*k*) is performed so that a total value of the uplink data amount notified to each ONU 20 by the physical DBA (S200-1-S200-*k*) may equal to the transmission permissible data determined by the logical DBA (S501) of the OLT 10. The boundary position of the DBA cycle 1 in the RE 10000 shifts from TL91 to TR1. Note that the frame processed in the DBA cycle-2 includes one or more 125-microsecond basic frames of the G-PON.

The transmission permissible data amount addressed to each ONU 20, which is indicated in the DBA cycle 1 (S300), is converted to the DBA information 2 by the physical DBA (S315), and is notified to the ONU 20 in a plurality of DBA cycle-2's (S220-1-S220-$k$). The uplink frames (S910-1-S910-$n$) from the ONU 20 in response to this notification are received as a burst signal, respectively, by the RE 10000, and are once stored in the RE 10000 until all of the total bandwidths of the DBA cycle 1 are received (i.e., until the reception of the responses to S220-1-S220-$k$ is completed). Subsequently, a burst-like frame (GEM frame) comprising these uplink data and header information from each ONU 20 is converted into a continuous optical signal 2000 (S920), which is then transmitted to the OLT 10 (S930). The respective uplink blocks S910-1-S910-$k$ indicate a response from the ONU corresponding to the bandwidth indications S220-1-S220-$k$ from the RE 10000. A transmission time S930 of the continuous optical signal 2000 addressed to the OLT 10 from the RE 10000 corresponds to a time width equal to the DBA cycle 1 (S300). The OLT 10 holds the transmission permissible data amount determined by the logical DBA for a DBA information-1 holding time 914 from the time instance TL91 at which the transmission permissible data amount is transmitted to a time instance TL93 at which the reception of the uplink data of the ONU 20 is completed, and confirms whether or not the indication from the OLT 10 agrees with the amount of data received from the ONU 20. Subsequently, this data is transferred to the access network 90 via the SNI side interface.

Figure 9:
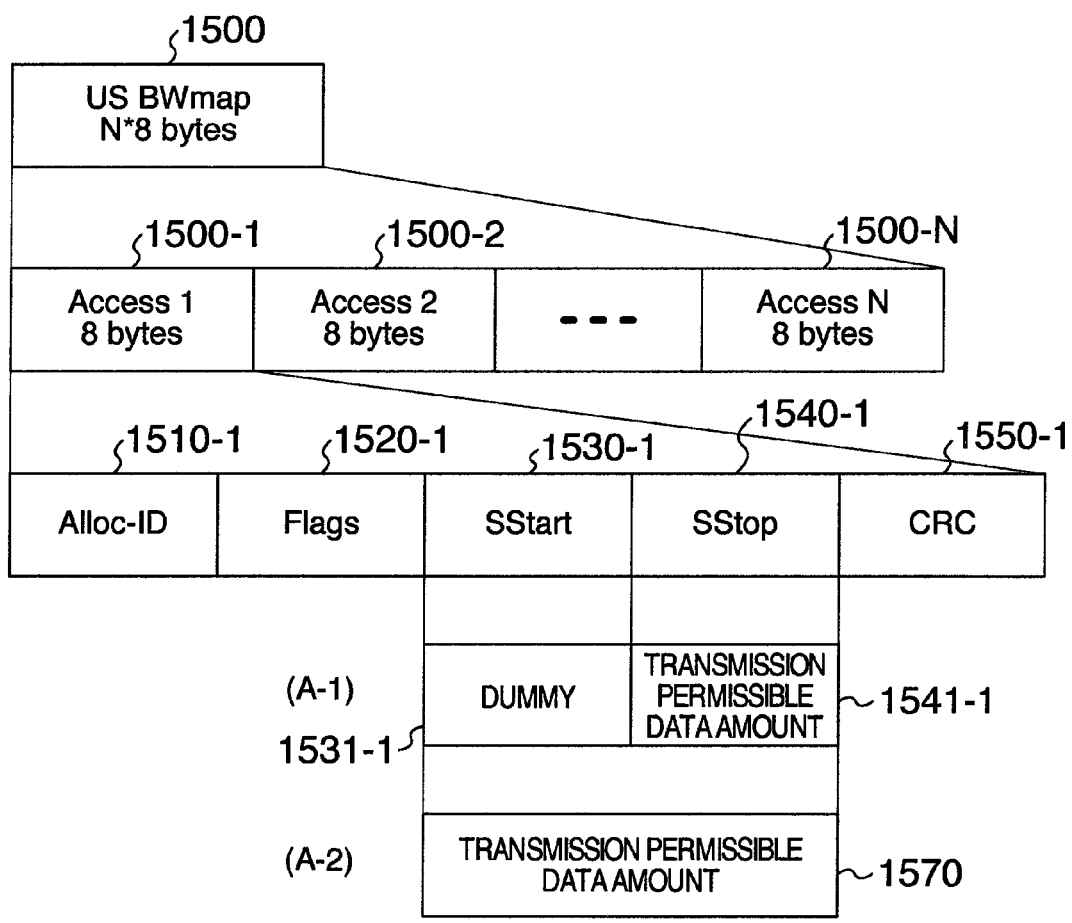
FIG. 9 is a signal configuration diagram showing a configuration example of a downlink signal between the OLT and the RE.

FIG. 9 is a signal configuration diagram showing a configuration example of the downlink signal between the OLT and RE, and shows an example of the signal for the OLT 10 to notify the RE 10000 of the transmission permissible data amount to each ONU determined by the logical DBA.

The signal used here is a signal utilizing the signal which has been used between the OLT 10 and ONU 20 before introducing the RE 10000, and a signal compliant with the downlink frame format of ITU-T Recommendation G. 984.3 is used here. Specifically, the field 1500 called US BWmap included in the downlink frame header is used. This field comprises one or more bandwidth indication information (access information) 1500-1-1500-N. The bandwidth indication fields 1500-1-1500-N respectively include a transmission start time SStart (1530) and a transmission end time SStop (1540) in order to give transmission permission to an Alloc-ID 1510 corresponding to one ONU and indicate the transmission timing. Flags 1520-1 and CRC 1550 are also the signals described in ITU-T Recommendation G984.3.

In order to notify the transmission permissible data amount from the OLT 10 to the RE 10000, as shown in (A-1), a certain field (SStart 1530-1) is replaced with a dummy 1531, and a transmission permissible data amount 1541 with respect to the relevant Alloc-ID1510-1 is inserted in a field where a bandwidth end position SStop 1540-1 is to be inserted. If the size of SStop 1540-1 is insufficient for carrying the data amount, the dummy 1531-1 of (A-1) may be made smaller and the data amount field 1541-1 may be made larger. Eventually, as shown in (A-1), the bandwidth indication fields 1530 and 1540 may be filled with band division information 1570. According to this structure, the processing amount of frame reconstruction in the RE 10000 is substantially the same as that of the original ONU 20, and the amount of the processing-related development in the OLT 10 and RE 10000 can be reduced.

FIGS. 10A, 10B are memory configuration diagrams respectively showing a configuration example of the database, which the OLT and RE include, used for the DBA processing.

A DB 400 for the DBA-1 processing stores the transmission permissible data amount for each ONU 20 determined by the logical DBA, and is used for the signal reception from each ONU based on the physical DBA and its response in the RE 10000. Assuming the same configuration as that of the DB 410 of the RE 10000 described later, the DB 400 includes an area 5001 for containing Alloc-ID which is the identifier of the ONU, an area 5002 for containing a transmission start timing, and an area 5004 for containing the transmission data amount. These areas contain the values which are determined by the logical DBA for each ONU 20. Note that the area 5002 contains a dummy data so as to align with the configuration of the signal described in FIG. 9. K times of physical DBA are executed in the RE 10000 corresponding to one time of execution of logical DBA in the OLT, and therefore as a value stored here, a total value of data which are transmitted from each ONU 20 by the k times of physical DBA is stored. Moreover, because the operation to delete the header of the signal received from each ONU 20 and convert the same into a continuous signal is performed by the RE 10000, a value larger than the data amount determined by the DBA of the conventional PON is determined taking into consideration the deleted header portion by the logical DBA, and is stored in this DB 400, in order to increase the utilization efficiency of bandwidth, as described earlier.

The DB 410 for the DBA-2 processing stores the bandwidth (data amount) and transmission timing for each ONU 20 determined by the physical DBA, and is used for transmission (S220) of the DBA information 2 and reception (S221) of its response. The DB 410 includes an area 5001 for containing the Alloc-ID which is the identifier of the ONU, an area 5002 for containing a transmission start timing, and an area 5004 for containing a transmission data amount. These areas contain the values which are determined by the physical DBA for each ONU 20. Note that the area 5004 may contain the transmission end timing. Furthermore, the data (not shown) used in the DBA-2 processing section 310, including the transmission permissible data amount for each ONU 20 determined by the logical DBA of the OLT 10, may be stored. This diagram shows that the area 5004 contains the value determined by one time of physical DBA, however, as described earlier, since k times of physical DBA are executed corresponding to one time of execution of logical DBA in the OLT, k areas (not shown) similar to the area as shown in this diagram are stored. Some of these k areas contain the indication to each ONU 20 based on the physical DBA. The DBA processings (logical DBA and physical DBA) of the OLT 10 and RE 10000 are performed so that a total value of data amounts shown in the area 5004 for each ONU 20 may be the transmission permissible data amount of the relevant ONU stored also in the DB 400. Note that, these pieces of information are held until a series of DBA processings, including the logical DBA in the OLT 10 as well, are completed (see the DBA information-1 hold time 914 in FIG. 8).

FIG. 11 is signal configuration diagrams showing configuration examples of an optical signal transmitted and received by the RE, and show a situation where a burst-like optical signal (GEM frame) received from each ONU 20 is converted into a continuous optical signal and transmitted to the OLT 10.

An uplink signal transmission time slot is operated in a constant cycle 13000-1 on the basis of a 125 microsecond cycle or the DBA processing cycle, in the case of G-PON. The GEM frame transmitted via the respective branch optical fibers 71-1-71-$n$ from each of the ONUs 20-1-20-$n$ passes through the splitter 30 and is optical time-division multiplexed into one line-concentration optical fiber 70-2. FIG. 11(A) shows a situation where the burst-like GEM frame from each ONU is multiplexed at a transmission timing (see DB 410 of FIG. 10B) determined by the physical DBA, and shows transmission positions of the data transmitted from the ONUs 20-1, 20-2, and 20-4 and their transmission data sizes. This diagram also shows a situation where the optical signal intensity of each GEM frame which the RE 10000 receives from the ONU 20 differs depending on differences in the distance from the ONU 20. In each GEM frame, the respective header information 19091, 19101, 19201 for each ONU are added in front of the respective payloads 19090, 19100, 19200 containing each data. Furthermore, between the respective GEM frames, there are provided guard times 19000-1 and 19000-2 for avoiding the overlapping of the operation conditions (the times required for activation/optical quenching) of the transmitter and receiver or the overlapping between signals. Note that, in G-PON, it is stipulated that the guard time is set to be equal to or greater than 32 bits.

FIG. 11(B) shows a signal configuration after collectively converting the GEM frames from the respective ONUS shown FIG. 11(A) into a continuous optical signal. The payloads 19090, 19100, and 19200 of the GEM frame included in the frame transmission cycle 13500 of FIG. 11(B) are the same as those of FIG. 11(A). In the RE 10000, the headers 19091, 19101, and 19201 given to the GEM frames are converted into headers 19092, 19102 and 19202 by deleting an unnecessary part from the headers 19091, 19101, and 19201, respectively, and furthermore the guard times 19000-1 and 19000-2 and the like are deleted in order to convert into a continuous optical signal, thereby reconstructing the frame.

In the continuous optical signal 20000 after the conversion, header information 13200 for frame synchronization is given to the start position corresponding to the DBA cycle 1 which the OLT 10 manages. The header 13200 (the detail of which is not illustrated) includes a frame synchronization pattern, which has been used in the conventional PON downlink frame, (corresponding to a PSync field in the case of GPON) for receiving the continuous signal.

Because the size of the header added to each GEM frame becomes small and the guard times are also deleted as a result of converting the GEM frames into a continuous optical signal 20000 by the RE 10000, the size of the continuous optical signal can be reduced. Alternatively, the GEM frames may be converted into a continuous optical signal with the same size as that of a signal having the payload increased by the amount of the deleted heads and having the received GEM frames simply made continuous. That is, the data from each ONU 20 can be transmitted with the size of the data made larger than that in the conventional PON (i.e., more bandwidths can be allocated by combining the logical DBA and the physical DBA), and the bandwidth use efficiency of the uplink signal will improve. Note that, the variations in the optical signal intensity between the received GEM frames are absorbed because when converted into a continuous optical signal, the optical signal is terminated once and converted into the continuous signal and subsequently is transmitted to the OLT 10 at a constant level as the optical signal 20000. As a result, the configuration and control of the reception O/E section 1320 of the OLT 10 are simplified and a reduction in the cost of the PON 40 (OLT 10) can be achieved. Payload areas 13600 and 13700 added to FIG. 11(B) indicate portions where burst data received in another uplink burst following the 125 microsecond frame 13000-1 is inserted in the RE 10000 (Refer to 13400). The same processing is performed also on the headers of the payloads 13600 and 13700, so that the header length is shortened and the guard time is deleted, respectively. The bandwidth consumed by the header 13200 given to each DBA cycle 1 can be sufficiently compensated by deleting the guard time and unnecessary header when converted into a continuous optical signal. Therefore, the longer the DBA cycle 1, the more the bandwidth use efficiency will improve.

In the conventional PON, the uplink frame is processed in the 125 microsecond basic cycle. The uplink frame transmission (and bandwidth allocation processing) extending over these basic cycles can be realized in order to reduce the overhead due to the header of the uplink frame, if it is within the DBA cycle. In the PON of the present invention, the DBA itself is divided into the logical DBA and physical DBA to be performed. The DBA in the conventional PON corresponds to the physical DBA of the PON of the present invention. By introducing a logic frame period containing a plurality of physical DBA cycles, the time division multiplex process can be performed with the periodic boundary between the logical frame periods as a reference point, and the uplink bandwidth use efficiency can be significantly improved as compared with the conventional PON. For this improvement rate, the larger the cycle length difference between the logical DBA processing cycle and the physical DBA processing cycle, the greater the effect becomes. The above-described effect appears in an uplink payload 13700. By performing the logical DBA processing, it is possible to provide a PON which allocates an uplink signal in a form extending over 125 microsecond cycles, which is not performed in the conventional PON.

FIG. 12 is also signal configuration diagrams showing other configuration examples of the optical signal transmitted and received by the RE, and illustrates a situation where the GEM frames received from the respective ONU 20's are converted into a continuous optical signal. Since the configuration of an uplink burst signal (GEM frame) 19050 is specified by ITU-T Recommendation G984.3, in the following this configuration is described briefly. First, the GEM frame mainly comprises a payload 19100 and a header 19101, and a PLOu field 21010 is provided in the front of a header area 19101. The PLOu field 21010 comprises a preamble, a delimiter area 19211, and other header 21200 including the ONU-ID and the like. Furthermore, a guard time 19000-1 is provided in front of the PLOu field 21010. The header 19101 contains the PLOAM field 21000 (including ONU ID 21111, MSG ID 21112, MSG 21113 and CRC 21114). Note that the transmission start time instructed to the ONU 20 indicates a starting position 1100 of the PLOAM field. The field 21000 includes an ONU-ID 19111, a message ID 19112, a PLOAM message body 19113, and a CRC 19114 which performs error detection of the PLOAM field. Furthermore, the uplink frame includes a field DBRu 21115 for inserting an uplink bandwidth request. The uplink frame further includes other uplink header 21116.

Among the above-described fields, the areas to be deleted from a GEM frame 19050 in converting the GEM frame 19050, which has been received from each ONU 20 in the RE 10000, into the continuous optical signal 20000, are portions other than the PLOAM field 21000 and DBRu. In FIG. 12(A), an area 22001 and an area 22002 are deleted (See 19051). The reasons why these areas can be deleted are as follows. The guard time 19000-1 and the preamble delimiter area 21211 become unnecessary at the time point when the RE 10000 synchronously received each GEM frame 19050. Each information in the PLOu field 21010 is the information used for processing the optical signal level. Therefore, these pieces of information can be deleted because the notification to the OLT 10 is not required when the optical signal is terminated once and converted into a continuous optical signal with a new light intensity level. Other header 21116 includes only a field for measuring the emission intensity of the ONU 20 called PLSu (Power Leveling Sequence upstream), however this field can be also deleted, as with the PLOu field 21010, because this field is also related to the optical signal level processing.

FIG. 12(B) shows a configuration example of the continuous optical signal 20000 transmitted from the RE 10000 to the OLT 10. In generating the continuous optical signal, the fields determined as unnecessary in each GEM frame 19050 are deleted. The PLOAM field 21000-1 and DBRu 21115 are inserted in the frame header 19102, while in the payload 19100, the payload 19100 of the GEM frame is inserted as it is. See a combined payload 30000. The explanations of PLOAM 31000, DBRu 32000 and payload 33000 are omitted. The continuous light header area 13200 includes a synchronization pattern 30100 to be used for bit synchronization and frame synchronization and a header area 30200 including other control information used for continuous light, so as to be able to receive the continuous optical signal 20000 after the conversion by the OLT 10. Based on the existing G-PON specification, the fields required for signal reception, such as the PSync field and BIP field, can be also utilized for this header information.

With the processings described above, the bit space essential for synchronization processing in a physical DBA boundary can be reduced in communication between the RE 10000 and OLT 10, and therefore an excess bandwidth corresponding to the deleted bit space can be used for other purposes including data transmission. That is, the bandwidth use efficiency will improve.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. An optical communication system, comprising: a master station is coupled to a plurality of slave stations by an optical fiber network including an optical splitter,
    wherein the optical fiber network further includes a reach extender transmitting and receiving between the master station and the slave stations,
    wherein the master station includes a first bandwidth control section which, based on uplink signal transmission requests from the slave stations, determines a first data amount of an uplink signal which each of the slave station transmits in a first cycle,
    wherein the reach extender includes:
        a distance measurement section which measures a transmission distance or a transmission time between the reach extender and each of the slave stations; and
        a second bandwidth control section which, based on uplink signal transmission requests from the slave stations and the first data amount, determines a second data amount and transmission timing of an uplink signal which each of the slave station transmits in a second cycle, and
    wherein each of the slave stations, based on a data amount and transmission timing which the distance measurement section and the second bandwidth control section determined in a plurality of the second cycles, transmits to the master station an uplink signal with a data amount which the first bandwidth control section determined in the first cycle.

2. The optical communication system according to claim 1, wherein the reach extender includes an uplink frame processing section, and wherein upon receipt of uplink signals from the respective slave stations at a timing which the second bandwidth control section determined, the reach extender puts together the uplink signals and converts the same into a continuous signal of the first cycle, and transmits this continuous signal to the master station.

3. The optical communication system according to claim 2, wherein a data amount of the uplink signals included in the continuous signal is a data amount determined by the first bandwidth control section and is a total sum of the data amounts which the second bandwidth control section determined in a plurality of the second cycles.

4. The optical communication system according to claim 2, wherein light intensities of uplink signals received by the reach extender from the respective slave stations differ from each other, and wherein a light intensity of an uplink continuous signal output to the master station after the conversion in the uplink frame processing section is constant.

5. The optical communication system according to claim 2, wherein an uplink signal received by the reach extender from each of the slave stations is a burst signal comprising a header portion and a payload portion including data, and wherein the uplink frame processing section deletes a predetermined area of the header of the burst signal and an area between the burst signals, and performs the conversion.

6. A method of controlling a communication bandwidth of an optical communication system wherein a master station is coupled to a plurality of slave stations by an optical fiber network including an optical splitter, and wherein the optical fiber network further includes a reach extender transmitting and receiving between the master station and the slave stations, the method comprising the steps of:
    upon receipt of uplink signal transmission requests from the slave stations via the reach extender, determining, by the master station, based on theses transmission requests, a first data amount of an uplink signal which each of the slave stations transmits in a first cycle, and notifying the first data amount to the reach extender;
    measuring, by the reach extender, a transmission distance or a transmission time between the reach extender and each of the slave stations in advance;
    determining, by the reach extender, based on uplink signal transmission requests from the slave stations and the first data amount, a second data amount and transmission timing of an uplink signal which each of the slave stations transmits in a second cycle, and notifying, by the reach extender, these information to each of the slave stations; and
    transmitting, by each of the slave stations, based on the data amount and transmission timing which the reach extender determined in a plurality of the second cycles, an uplink signal with a data amount which the master station determined in the first cycle.

7. The method of controlling a communication bandwidth according to claim 6, further comprising the step of:
    upon receipt of uplink signals from the respective slave stations at a timing determined by the reach extender, putting together these uplink signals and converting the same into a continuous signal of the first cycle and transmitting the continuous signal to the master station by the reach extender.

8. The method of controlling a communication bandwidth according to claim 7, wherein a data amount of the uplink signals included in the continuous signal is a data amount determined by the master station, and is a total sum of data amounts which the reach extender determined in a plurality of the second cycles.

9. The method of controlling a communication bandwidth according to claim 7, wherein the uplink signal received from each of the slave stations by the reach extender is a burst signal comprising a header portion, and a payload portion including data, the method further comprising the step of deleting a predetermined area of the header portion of the burst signal and an area between the burst signals, and performing the conversion.

* * * * *